US009960847B2

(12) United States Patent
Moriwaki et al.

(10) Patent No.: US 9,960,847 B2
(45) Date of Patent: May 1, 2018

(54) INFORMATION PRESENTING METHOD, SERVER, AND INFORMATION PRESENTING SYSTEM

(71) Applicant: Panasonic Intellectual Property Management Co., Ltd., Osaka (JP)

(72) Inventors: Toshiya Moriwaki, Kyoto (JP); Yoshiaki Ueno, Kyoto (JP); Itaru Onishi, Osaka (JP); Shojiro Kido, Osaka (JP); Tamotsu Ando, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days. days.

(21) Appl. No.: 15/259,772

(22) Filed: Sep. 8, 2016

(65) Prior Publication Data

US 2017/0078019 A1    Mar. 16, 2017

(30) Foreign Application Priority Data

Sep. 10, 2015  (JP) ................. 2015-178963

(51) Int. Cl.
*H04B 10/00* (2013.01)
*H04B 10/116* (2013.01)
*H04B 10/80* (2013.01)
*H04L 29/06* (2006.01)
*G08G 1/133* (2006.01)
*G08G 1/005* (2006.01)

(52) U.S. Cl.
CPC .......... *H04B 10/116* (2013.01); *G08G 1/005* (2013.01); *G08G 1/133* (2013.01); *H04B 10/80* (2013.01); *H04L 63/08* (2013.01)

(58) Field of Classification Search
CPC ...... H04B 10/116; H04B 10/80; G08G 1/005; G08G 1/133; H04L 63/08
USPC ........................................ 398/118
See application file for complete search history.

(56) References Cited

U.S. PATENT DOCUMENTS

| 5,619,361 A | 4/1997 | Sagesaka et al. |
| 7,027,767 B2 * | 4/2006 | de La Chapelle . B64D 11/0015 455/3.01 |

(Continued)

FOREIGN PATENT DOCUMENTS

| JP | 6-291732 A | 10/1994 |
| JP | 2004-297295 A | 10/2004 |

(Continued)

*Primary Examiner* — Juan A Torres
(74) *Attorney, Agent, or Firm* — McDermott Will & Emery LLP

(57) ABSTRACT

In an information presenting method, visible light including unique information, which is unique to a passenger carrier and specific to a location of the carrier, is emitted. The light is received in the passenger space and the unique information is obtained. One or more stop points at which the carrier is currently stopped or is to subsequently stop are obtained. The one or more stop points are derived from the unique information. An alighting point at which a user is to alight from the carrier is obtained. Whether the alighting point is included in the one or more stop points is determined. Alighting information notifying the user to alight from the bus is presented to the user via a terminal, when the alighting point is determined to be included in the one or more stop points.

15 Claims, 22 Drawing Sheets

(56) References Cited

U.S. PATENT DOCUMENTS

| | | |
|---|---|---|
| 2006/0056855 A1 | 3/2006 | Nakagawa et al. |
| 2008/0310850 A1* | 12/2008 | Pederson ............ G07C 9/00158 398/135 |
| 2009/0297156 A1 | 12/2009 | Nakagawa et al. |
| 2009/0297157 A1 | 12/2009 | Nakagawa |
| 2009/0297166 A1 | 12/2009 | Nakagawa et al. |
| 2009/0297167 A1 | 12/2009 | Nakagawa et al. |
| 2009/0310976 A1 | 12/2009 | Nakagawa et al. |
| 2011/0069958 A1 | 3/2011 | Haas et al. |
| 2011/0302616 A1 | 12/2011 | Mizukami et al. |
| 2014/0280316 A1* | 9/2014 | Ganick ............ G06F 17/30522 707/769 |
| 2014/0321860 A1 | 10/2014 | Kido et al. |
| 2014/0375982 A1* | 12/2014 | Jovicic ................. G01B 11/14 356/72 |
| 2015/0036016 A1* | 2/2015 | Jovicic ................. H04W 4/026 348/222.1 |
| 2015/0163459 A1* | 6/2015 | Jovicic ................. H04N 7/183 348/143 |
| 2015/0276399 A1* | 10/2015 | Breuer .................... G01C 3/08 356/4.03 |
| 2015/0372753 A1* | 12/2015 | Jovicic ................ H04B 10/116 398/172 |

FOREIGN PATENT DOCUMENTS

| | | |
|---|---|---|
| JP | 2005-322965 A | 11/2005 |
| JP | 2007-024935 A | 2/2007 |
| JP | 2007-249705 A | 9/2007 |
| JP | 2009-005304 A | 1/2009 |
| JP | 2009-015274 A | 1/2009 |
| JP | 2009-085784 A | 4/2009 |
| JP | 2009-259175 A | 11/2009 |
| JP | 2010-102279 A | 5/2010 |
| JP | 2011-128948 A | 6/2011 |
| JP | 2011-519237 A | 6/2011 |
| JP | 2011-254285 A | 12/2011 |
| JP | 2012-039556 A | 2/2012 |
| JP | 2013-110599 A | 6/2013 |
| JP | 2013-210713 A | 10/2013 |
| WO | 2009132877 A1 | 11/2009 |

* cited by examiner

INFORMATION PRESENTING METHOD, SERVER, AND INFORMATION PRESENTING SYSTEM

CROSS REFERENCE TO RELATED APPLICATION

This application claims the benefit of priority of Japanese Patent Application Number 2015-178963 filed on Sep. 10, 2015, the entire content of which is hereby incorporated by reference.

BACKGROUND

1. Technical Field

The present disclosure relates to an information presenting method, a server, and an information presenting system.

2. Description of the Related Art

A passenger who boards public transportation such as a railroad and a bus (hereinafter, also referred to as a passenger carrier) wishes to know a current location of the public transportation while the passenger is on the public transportation, and make sure that the passenger alights from the public transportation at a point where the passenger plans to get off.

Conventionally, a technique of providing detailed public transportation guide information in accordance with a travel plan of a passenger has been disclosed (see Japanese Unexamined Patent Application Publication No. 2009-85784, for example).

SUMMARY

However, for example, if the passenger cannot appropriately grasp a current location of the passenger carrier or if the passenger cannot appropriately determine, due to, for instance, a language problem, whether the place is a point at which the passenger needs to alight from the passenger carrier, the passenger may not alight from the passenger carrier appropriately.

In view of this, the present disclosure provides an information presenting method for appropriately presenting alighting information to a passenger.

In order to appropriately present such information, an information presenting method according to an aspect of the present disclosure is an information presenting method for presenting information to a passenger on a passenger carrier which stops at predetermined boarding-and-alighting points, the information presenting method including: (a) emitting, by a lighting apparatus provided in the passenger carrier, light to a passenger space of the passenger carrier, the light including, in form of a visible light communication signal, unique information which is unique to the passenger carrier and specific to a location of the passenger carrier; (b) receiving in the passenger space, by a terminal carried by the passenger, the light emitted in (a) and obtaining the unique information included in the received light; (c) obtaining, among the predetermined boarding-and-alighting points, one or more stop points at which the passenger carrier is currently stopped or is to subsequently stop, the one or more stop points being derived from the obtained unique information; (d) receiving an alighting point at which the passenger is to alight from the passenger carrier; (e) determining whether the alighting point is included in the one or more stop points; and (O presenting, to the passenger via the terminal, alighting information notifying the passenger to alight from the passenger carrier, when the alighting point is determined to be included in the one or more stop points in (e).

In order to appropriately present such information, a server according to an aspect of the present disclosure includes: a memory storing one or more pieces of predetermined information associated with one or more of predetermined boarding-and-alighting points at which a passenger carrier stops; a unique information receiver which receives unique information which is unique to the passenger carrier and specific to a location of the passenger carrier, and an alighting point at which a passenger is to alight from the passenger carrier; a determiner which determines whether the unique information received by the unique information receiver is authentic; and a predetermined transmitter which transmits, among the one or more pieces of predetermined information, predetermined information associated with the alighting point received by the unique information receiver, when the determiner determines the unique information to be authentic.

In order to appropriately present such information, an information presenting system according to an aspect of the present disclosure is an information presenting system which presents information to a passenger on a passenger carrier which stops at predetermined boarding-and-alighting points, the information presenting system including: a lighting apparatus provided in the passenger carrier; and a terminal carried by the passenger, wherein the lighting apparatus includes a light emitter which emits light to a passenger space of the passenger carrier, the light including, in form of a visible light communication signal, unique information which is unique to the passenger carrier and specific to a location of the passenger carrier, and the terminal includes: a receiver which receives, in the passenger space, the light emitted by the light emitter, and obtains the unique information included in the received light; an obtainer which obtains, among the predetermined boarding-and-alighting points, one or more stop points at which the passenger carrier is currently stopped or is to subsequently stop, the one or more stop points being derived from the obtained unique information; a user interface which receives input of an alighting point at which the passenger is to alight from the passenger carrier; a determiner which determines whether the passenger carrier is near the alighting point, by comparing the one or more stop points and the alighting point; and a presenter which presents, to the passenger, alighting information indicating that the passenger carrier is near the alighting point, when the determiner determines the passenger carrier to be near the alighting point.

The information presenting method according to the present disclosure appropriately presents alighting information to a passenger.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

The following describes lighting apparatuses according to embodiments of the present disclosure, with reference to the drawings. The embodiments described below each show a specific example. The numerical values, shapes, materials, elements, the arrangement and connection of the elements, steps, the order of processing the steps, and others described in the following embodiments are mere examples, and therefore are not intended to limit the present disclosure. Therefore, among the elements in the following embodiments, elements not recited in any of the independent claims defining the most generic concept of the present disclosure are described as arbitrary elements. Note that the drawings are schematic diagrams, and do not necessarily provide strictly accurate illustration.

Embodiment 1

The present embodiment describes an information presenting system and an information presenting method which appropriately present alighting information to a passenger.

Figure 1:
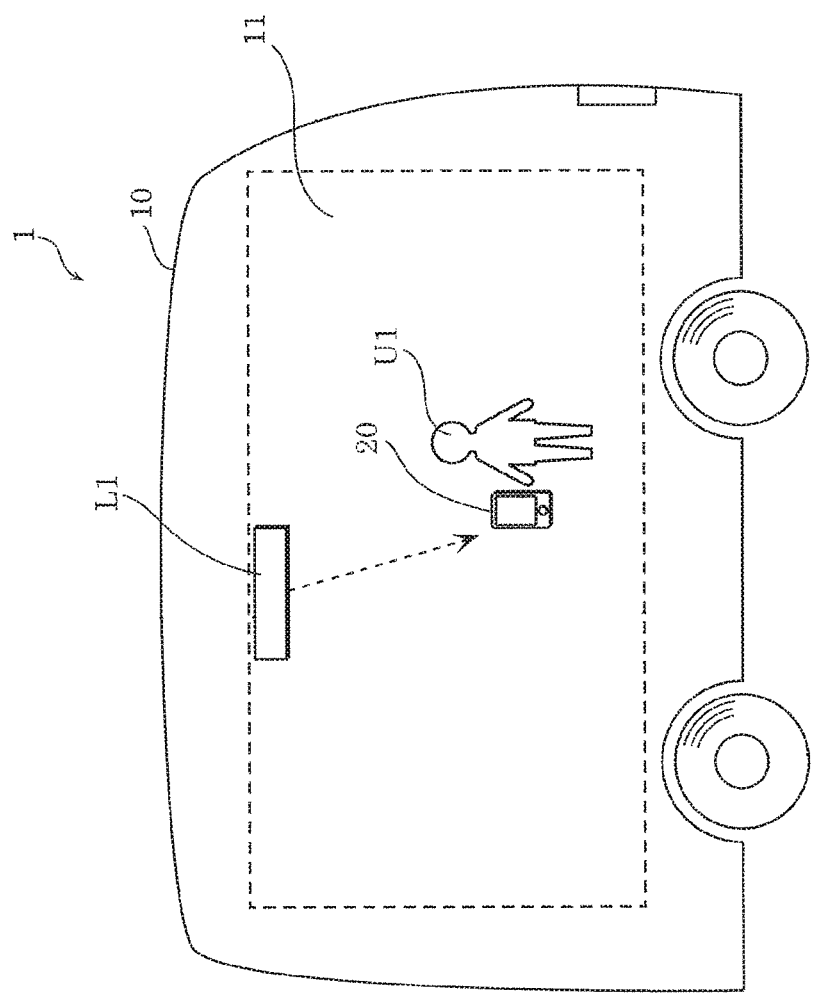
FIG. 1 is a conceptual diagram illustrating an information presenting system according to Embodiment 1.

FIG. 1 is a conceptual diagram illustrating information presenting system 1 according to the present embodiment.

As illustrated in FIG. 1, information presenting system 1 includes lighting apparatus L1 provided in passenger space 11 of bus 10, and terminal 20.

Bus 10 is an example of public transportation which unspecified users can use, or more specifically, an example of public transportation. Bus 10 travels along a predetermined route, and stops at predetermined boarding-and-alighting points (also referred to as bus stops) on the above predetermined route so that a user can board or alight from bus 10.

Bus 10 is an example of a passenger carrier. A train and a ship may be other examples of a passenger carrier. In the following, a description is given using bus 10 as an example of a passenger carrier, yet the same description also applies to other passenger carriers such as a train and a ship. A predetermined boarding-and-alighting point is a station if the passenger carrier is a train, and is a harbor if the passenger carrier is a ship.

Passenger space 11 is the space inside bus 10 where user U1 who is a passenger stays while on the bus. Lighting apparatus L1 is provided in passenger space 11, and emits light which includes a signal for visible light communication (hereinafter, also referred to as a visible light communication signal). For example, a seat for user U1 to sit down (not illustrated) may also be provided in passenger space 11.

Lighting apparatus L1 is a lighting apparatus for visible light communication provided in bus 10. Lighting apparatus L1 emits light which includes a visible light communication signal to passenger space 11.

User U1 is a person who boards bus 10 and is in passenger space 11. User U1 carries terminal 20, and obtains and generates information using terminal 20.

Terminal 20 is an information processing terminal used by user U1. Note that terminal 20 may be an information processing terminal used by user U1, and user U1 may have or may not have the ownership of terminal 20, which does not matter.

Figure 2:
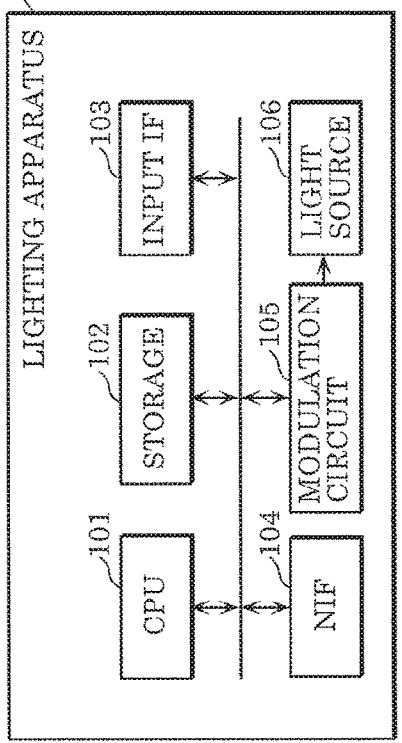
FIG. 2 is a block diagram illustrating a hardware configuration of a lighting apparatus according to Embodiment 1.

FIG. 2 is a block diagram illustrating a hardware configuration of lighting apparatus L1 according to the present embodiment.

As illustrated in FIG. 2, lighting apparatus L1 includes central processing unit (CPU) 101, storage 102, input interface (IF) 103 and network interface (NIF) 104, modulation circuit 105, and light source 106.

CPU 101 is a processor which executes a program stored in storage 102. When CPU 101 executes the program, functions of the functional blocks (described alter) included in lighting apparatus L1 are achieved.

Storage 102 is a nonvolatile storage area for storing programs, for instance.

Input IF 103 is an interface device which receives operation by user U1, and specifically is achieved by a button, for instance.

NIF 104 is an interface device which transmits and receives information to/from another apparatus via a network. The network is a mobile phone line or a wireless local area network (LAN) compatible with, for example, standards such as IEEE802.11a, IEEE802.11b, IEEE802.11g, and IEEE802.11n. An interface device according to the network type is used as NIF 104.

Modulation circuit 105 modulates the amplitude of light emitted by light source 106, by modulating the value of a current to be supplied to light source 106. Modulation circuit 105 modulates the value of a current to be supplied to light source 106 in accordance with a visible light communication signal, and thereafter light source 106 emits light which includes the visible light communication signal.

Light source 106 emits light. Light source 106 outputs light having an amplitude according to the value of the supplied current, thus illuminating an area surrounding lighting apparatus L1. Furthermore, if the value of the supplied current is modulated in accordance with a visible light communication signal, light source 106 transmits a visible light communication signal to the surrounding area through the above illumination.

Figure 3:
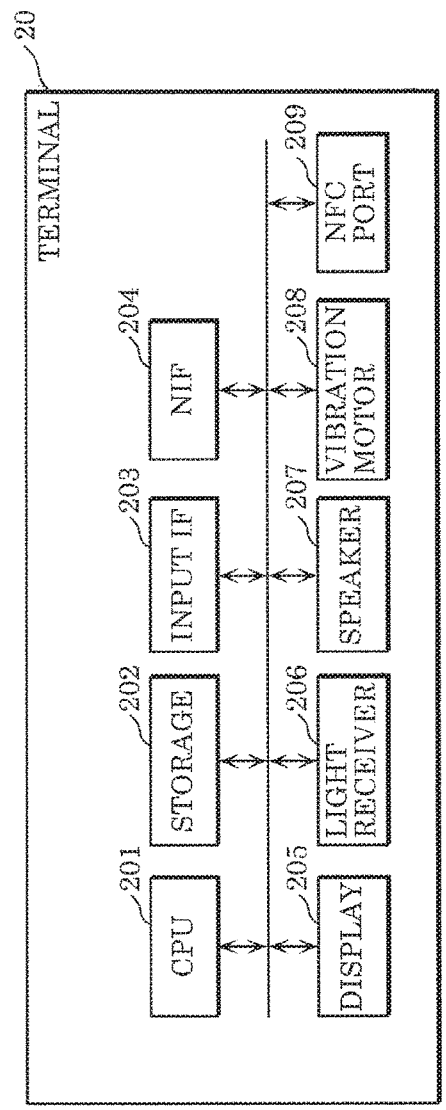
FIG. 3 is a block diagram illustrating a hardware configuration of a terminal according to Embodiment 1.

FIG. 3 is a block diagram illustrating a hardware configuration of terminal 20 according to the present embodiment.

As illustrated in FIG. 3, terminal 20 includes CPU 201, storage 202, input IF 203, NIF 204, display 205, light receiver 206, speaker 207, vibration motor 208, and near field communication (NFC, near field radio communication) port 209.

CPU 201 is a processor which executes a program stored in storage 202. When CPU 201 executes the program, functions of the functional blocks (later described) included in terminal 20 are achieved.

Storage 202 is a nonvolatile storage area for storing programs, for instance.

Input IF 203 is an interface device which receives operation by user U1, and specifically is achieved by a button, a touch panel, or the like.

NIF 204 is an interface device which transmits and receives information to/from another apparatus via a network. NIF 204 is achieved by a mobile phone line or a wireless LAN compatible with standards such as IEEE802.11a, IEEE802.11b, IEEE802.11g, and IEEE802.11n, for example.

Display 205 displays an image. Display 205 is achieved by a liquid crystal display (which may be a display portion of a touch panel liquid crystal display), for example.

Light receiver 206 receives light from the surroundings and outputs an intensity of received light which is a value according to the intensity of received light. Note that light receiver 206 is achieved by a photodiode or camera (imaging device), for instance.

Speaker 207 is an audio output device which outputs sound.

Vibration motor 208 is a vibration generator which generates vibration.

NFC port 209 is a communication-interface device which communicates with other apparatuses by NFC.

The following describes functions of lighting apparatus L1 and terminal having the above configurations.

Figure 4:
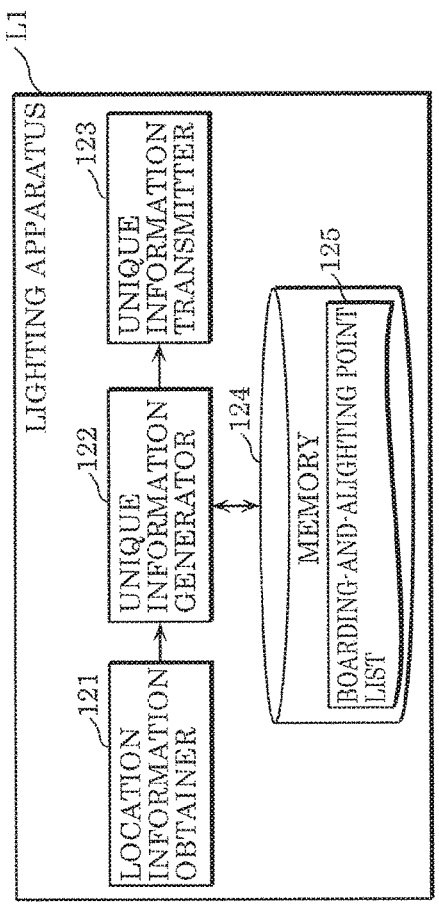
FIG. 4 is a block diagram illustrating a functional configuration of the lighting apparatus according to Embodiment 1.

FIG. 4 is a block diagram illustrating a functional configuration of lighting apparatus L1 according to the present embodiment.

As illustrated in FIG. 4, lighting apparatus L1 includes location information obtainer 121, unique information generator 122, unique information transmitter 123, and memory 124.

Location information obtainer 121 obtains location information indicating the current position of bus 10 (hereinafter, also simply referred to as location information). Location information obtainer 121 obtains location information of bus 10 by, for example, global positioning system (GPS), and provides unique information generator 122 with the obtained location information. Location information obtainer 121 is achieved by CPU 101 and storage 102, for instance.

Unique information generator 122 generates unique information which is unique to bus 10 traveling along a route and specific to the position of bus 10. Specifically, unique information generator 122 obtains location information from location information obtainer 121, and generates unique information using the obtained location information and boarding-and-alighting point list 125 stored in memory 124. Unique information generator 122 is achieved by CPU 101 and storage 102, for instance.

Unique information is information unique to bus 10 and specific to the location of bus 10, and is generated by linking such information, for example.

For example, an identifier which identifies bus 10 from other buses can be used as information unique to bus 10. Note that information unique to lighting apparatus L1 can be used as information unique to bus 10. As information unique to lighting apparatus L1, an identifier which identifies one lighting apparatus L1 from other lighting apparatuses can be used.

As information specific to location information, information for determining whether bus 10 is at any of boarding-and-alighting points or at a point between a boarding-and-alighting point and the next boarding-and-alighting point (hereinafter, also referred to as a midway point) can be used. In order to generate location specific information, unique information generator 122 obtains boarding-and-alighting point list 125 stored in memory 124, and determines whether location information obtained from location information obtainer 121 indicates a boarding-and-alighting point included in boarding-and-alighting point list 125 or a midway point. Note that if bus 10 is at a point, this also implies that bus 10 is near the point in addition to the case where bus 10 is strictly at the point. Here, "near" may be a range where a person can recognized that bus 10 is at the point, and the range may be set to, for example, about 5 m to 10 m.

Unique information transmitter 123 transmits unique information generated by unique information generator 122 to terminal 20 by visible light communication. Unique information transmitter 123 is achieved by CPU 101, storage 102, modulation circuit 105, and light source 106, for instance. Unique information transmitter 123 corresponds to a light emitter.

Memory 124 is a storage device which stores boarding-and-alighting point list 125. Boarding-and-alighting point list 125 is a list of boarding-and-alighting points which are points at which bus 10 may stop. Memory 124 is achieved by storage 102.

Figure 5:
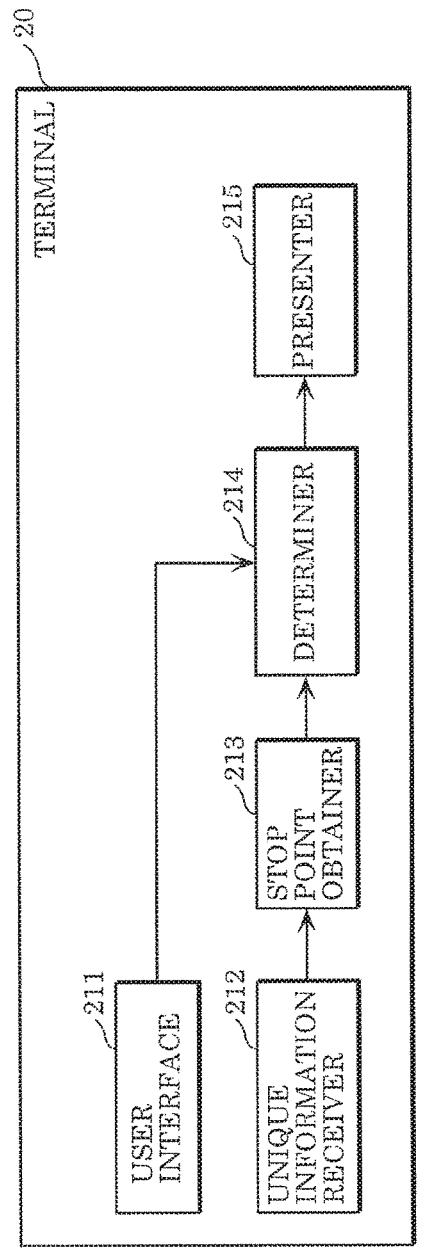
FIG. 5 is a block diagram illustrating a functional configuration of the terminal according to Embodiment 1.

FIG. 5 is a block diagram illustrating a functional configuration of terminal 20 according to the present embodiment. As illustrated in FIG. 5, terminal 20 includes user interface 211, unique information receiver 212, stop point obtainer 213, determiner 214, and presenter 215.

User interface 211 receives input of an alighting point which is a point at which user U1 is to alight from bus 10. User interface 211 presents, to user U1, a list of boarding-and-alighting points of bus 10 on display 205, for example, and receives, via input IF 203, input of a point selected as a point at which user U1 is to alight from bus 10 from among the presented boarding-and-alighting points. User interface 211 is achieved by CPU 201, storage 202, and input IF 203, for instance.

Unique information receiver 212 receives a visible light communication signal from lighting apparatus L1. Specifically, unique information receiver 212 receives light which includes unique information in the form of a visible light communication signal and is emitted by lighting apparatus L1, and obtains the unique information included in the received light in the form of a visible light communication signal. Note that unique information receiver 212 is achieved by CPU 201, storage 202, and light receiver 206, for instance. Unique information receiver 212 corresponds to a receiver.

Stop point obtainer 213 obtains, among boarding-and-alighting points, one or more stop points at which bus 10 is currently stopped or is to subsequently stop, the one or more stop points being derived from the unique information obtained by unique information receiver 212. Stop point obtainer 213 stores the list of boarding-and-alighting points of bus 10, for example, and based on unique information obtained by unique information receiver 212, obtains one or more stop points at which bus 10 is currently stopped or is to subsequently stop. Stop point obtainer 213 is achieved by CPU 201 and storage 202, for instance. Stop point obtainer 213 corresponds to an obtainer.

Note that terminal 20 may obtain the one or more stop points using a server device. Specifically, a server device connected to terminal 20 so as to communicate with terminal 20 may store the above list, stop point obtainer 213 may transmit unique information to the server device, the server device may calculate one or more stop points at which bus 10 is currently stopped or is to subsequently stop, and terminal 20 may receive the stop point(s) calculated by the server device.

Determiner 214 determines whether an alighting point is included in the one or more stop points. Specifically, if there is one stop point, determiner 214 determines the alighting point to be included in the stop point if the one stop point matches the alighting point. If there are plural stop points, determiner 214 may determine the alighting point to be included in the stop points if a stop point (next stop point) at which bus 10 is to stop next among the stop points matches the alighting point. Determiner 214 is achieved by CPU 201 and storage 202, for instance.

If determiner 214 determines an alighting point to be included in one or more stop points, presenter 215 presents, to user U1, alighting information notifying user U1 to alight from bus 10. Presenter 215 presents, to user U1, alighting information by: generating an image showing alighting information and displaying the image on display 205; generating audio data indicating alighting information and outputting the audio data from speaker 207; and generating vibration data indicating alighting information and generating vibration with vibration motor 208, for instance. Presenter 215 is achieved by CPU 201, storage 202, display 205, speaker 207, and vibration motor 208, for instance.

The following describes in detail operation of lighting apparatus L1 and terminal 20 having the above configurations. First, a description of, for instance, preconditions for operation of lighting apparatus L1 and terminal 20, including a route of bus 10, is given.

Figure 6:
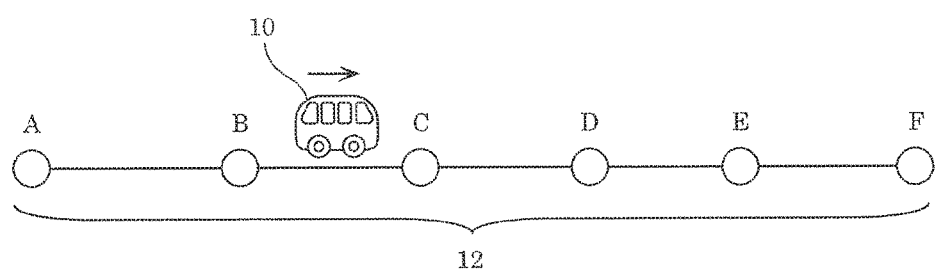
FIG. 6 is a schematic diagram illustrating a route and boarding-and-alighting points of a bus in Embodiment 1.

FIG. 6 is a schematic diagram illustrating route 12 and boarding-and-alighting points of bus 10 according to the present embodiment.

Route 12 illustrated in FIG. 6 is a route along which bus 10 travels. Route 12 has points A, B, C, D, E, and F, as the boarding-and-alighting points (bus stops) at which users can board and alight from bus 10. Bus 10 travels from point A to point F along route 12, and stops at the points one by one so that users board and alight from bus 10.

In the following, it is assumed that user U1 is on bus 10 and is to alight from bus 10 at point E, and bus 10 is between points B and C. Furthermore, the case where stop point obtainer 213 obtains one stop point (i.e., a stop point at which bus 10 is currently stopped or is to stop next) is described as an example.

Figure 8:
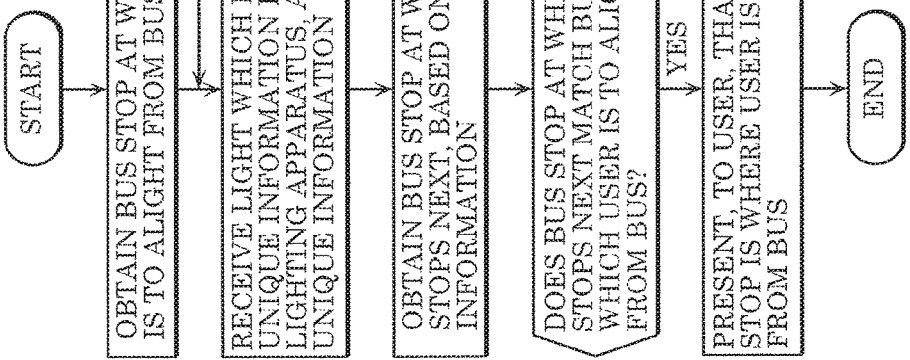
FIG. 8 is a flow chart illustrating processing by the terminal according to Embodiment 1.
Figure 7:
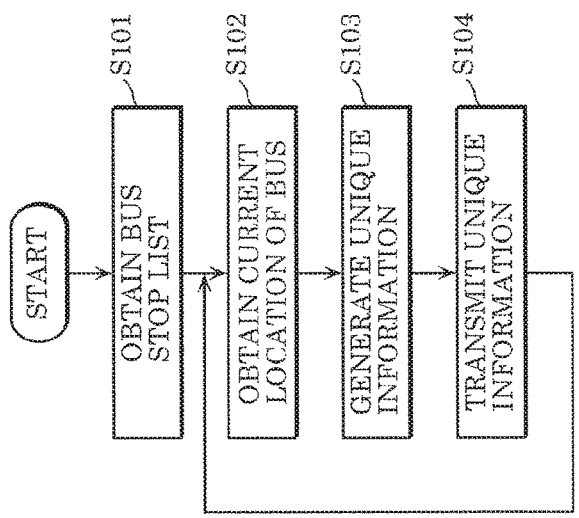
FIG. 7 is a flow chart illustrating processing by the lighting apparatus according to Embodiment 1.
Figure 9:
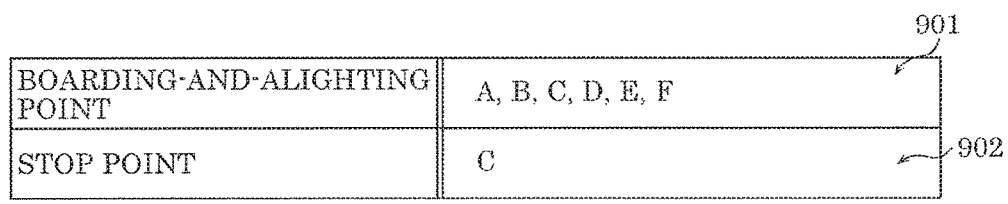
FIG. 9 is an explanatory diagram of boarding-and-alighting points and a stop point according to Embodiment 1.
Figure 10:
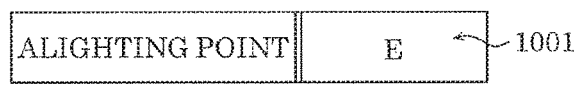
FIG. 10 is an explanatory diagram of an alighting point according to Embodiment 1.

FIG. 7 is a flow chart illustrating processing by lighting apparatus L1 according to the present embodiment. FIG. 8 is a flow chart illustrating processing by terminal 20 according to the present embodiment. FIG. 9 is an explanatory diagram of boarding-and-alighting points and a stop point according to the present embodiment. FIG. 10 is an explanatory diagram of an alighting point according to the present embodiment. Processing by lighting apparatus L1 and terminal 20 is now described with reference to the drawings.

First, processing by lighting apparatus L1 is described.

As illustrated in FIG. 7, in step S101, unique information generator 122 obtains a bus stop list which is the boarding-and-alighting point list. The bus stop list indicates boarding-and-alighting points on a route, and is shown by boarding-and-alighting points 901 in FIG. 9. Here, unique information generator 122 may obtain a bus stop list from the outside of bus 10 via a communication line and NIF 104, or may obtain a bus stop list obtained in advance and stored in memory 124.

In step S102, location information obtainer 121 obtains location information indicating the current location of bus 10. Specifically, location information obtainer 121 obtains location information of a point on the route between points A and B as location information of bus 10.

In step S103, unique information generator 122 generates unique information which is unique to bus 10 and specific to the location of bus 10.

In step S104, unique information transmitter 123 emits light which includes, in the form of a visible light communication signal, the unique information generated by unique information generator 122 in step S103 (light transmission step). Note that unique information transmitter 123 may emit such light only when bus 10 is at a midway point. Because when bus 10 is stopped at a boarding-and-alighting point, it is not necessary to present, to user U1, a point at which user U1 is to alight from bus 10. Also, because even if the above light is emitted to a terminal of a user who boards, but immediately alights from bus 10 and then the terminal receives unique information while bus 10 is stopped at a bus stop, alighting information cannot be appropriately presented via the terminal.

The following describes processing by terminal 20.

As illustrated in FIG. 8, in step S201, user interface 211 receives input of a bus stop at which user U1 is to alight from bus 10 as an alighting point (input receiving step). The alighting point is point E as shown by alighting point 1001 in FIG. 10.

In step S202, unique information receiver 212 receives light which includes unique information in the form of a visible light communication signal from lighting apparatus L1, and obtains the unique information from the received light (receiving step).

In step S203, stop point obtainer 213 obtains a bus stop at which bus 10 is currently stopped or is to stop next, based on the unique information obtained in step S202 (obtaining step). The bus stop at which bus 10 stops next is point C as shown by stop point 902 in FIG. 9.

In step S204, determiner 214 determines whether the alighting point is included in the stop point. Specifically, for example, determiner 214 determines whether the next bus stop matches the bus stop at which user U1 is to alight from bus 10.

If determiner 214 determines in step S204 the bus stop at which bus 10 is to stop next to match the bus stop at which user U1 is to alight from bus 10 (YES in step S204), the processing proceeds to step S205, whereas if determiner 214 determines the bus stops not to match (NO in step S204), the processing returns to step S202.

Specifically, for example, when bus 10 is between points B and C as illustrated in FIG. 6, point C which is the bus stop at which bus 10 stops next does not match point E which is the alighting point, and thus the processing returns to step S202. For example, when bus 10 is between points D and E (not illustrated), point E which is a bus stop at which bus 10 is to stop next matches point E which is the alighting point, and thus the processing proceeds to step S205.

Figure 11:
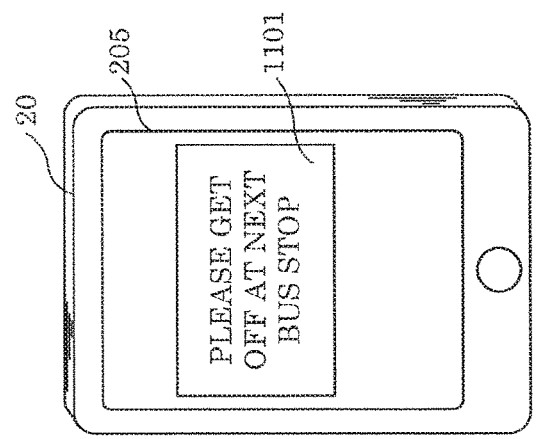
FIG. 11 is an explanatory diagram illustrating an example of information presented to a user according to Embodiment 1.

In step S205, presenter 215 presents, to user U1, alighting information 1101 notifying user U1 to alight from bus 10. For example, as illustrated in FIG. 11, presenter 215 presents, to user U1, alighting information 1101 by displaying an image showing alighting information 1101 on display 205.

Information presenting system 1 appropriately presents an alighting point to user U1 through a series of the above processes. Since information presenting system 1 causes lighting apparatus L1 to transmit unique information to terminal 20 by visible light communication, information presenting system 1 has an advantage of preventing the unique information from being leaked out of bus 10 while allowing terminal 20 to receive the unique information.

As described above, the information presenting method according to the present embodiment is an information presenting method for presenting information to user U1 on bus 10 which stops at predetermined boarding-and-alighting points, the information presenting method including: (a) emitting, by lighting apparatus L1 provided in bus 10, light to passenger space 11 of bus 10, the light including, in form of a visible light communication signal, unique information which is unique to bus 10 and specific to a location of bus 10; (b) receiving in passenger space 11, by terminal 20 carried by user U1, the light emitted in (a) to obtain the unique information included in the received light; (c) obtaining, among the predetermined boarding-and-alighting points, one or more stop points at which bus 10 is currently stopped or is to subsequently stop, the one or more stop points being derived from the obtained unique information; (d) receiving an alighting point at which user U1 is to alight from bus 10; (e) determining whether the alighting point is included in the one or more stop points; and (f) presenting, to user U1 via terminal 20, alighting information notifying user U1 to alight from bus 10, when the alighting point is determined to be included in the one or more stop points in (e).

According to this, information presenting system 1 appropriately presents to user U1 alighting information via terminal 20 based on unique information which is unique to bus 10 and specific to the location of bus 10. User U1 can alight from bus 10, based on the above presentation. In particular, unique information is transmitted and received in bus 10 through visible light communication. Thus, unique information is received by terminal 20 in bus 10, and can also be prevented from being leaked out of bus 10. Accordingly, information presenting system 1 can appropriately present alighting information to a passenger.

In (c), among the one or more stop points, a next stop point at which bus 10 is currently stopped or is to stop next may be obtained, and in (e), whether the next stop point and the alighting point match may be determined.

According to this, information presenting system 1 presents alighting information to user U1 when a boarding-and-alighting point at which bus 10 is currently stopped or is to stop next is a bus stop at which user U1 is to alight from bus 10. Based on the above presentation, user U1 can alight from bus 10 more appropriately.

In (a), the light may be emitted only when bus 10 is on a route of bus 10 at a point other than the predetermined boarding-and-alighting points.

According to this, while bus 10 is stopped at a stop point, information presenting system 1 does not transmit unique information. Accordingly, information presenting system 1 can prevent the terminal of the user from receiving unique information if the user boards bus 10 stopped at the stop point, but immediately alights from bus 10.

Embodiment 2

The present embodiment describes a technique of giving a passenger a special offer with an information presenting system and an information presenting method which appropriately present alighting information to the passenger. Note that the same reference numeral may be given to the same element as that in Embodiment 1, and thus a detailed description thereof may be omitted.

Figure 12:
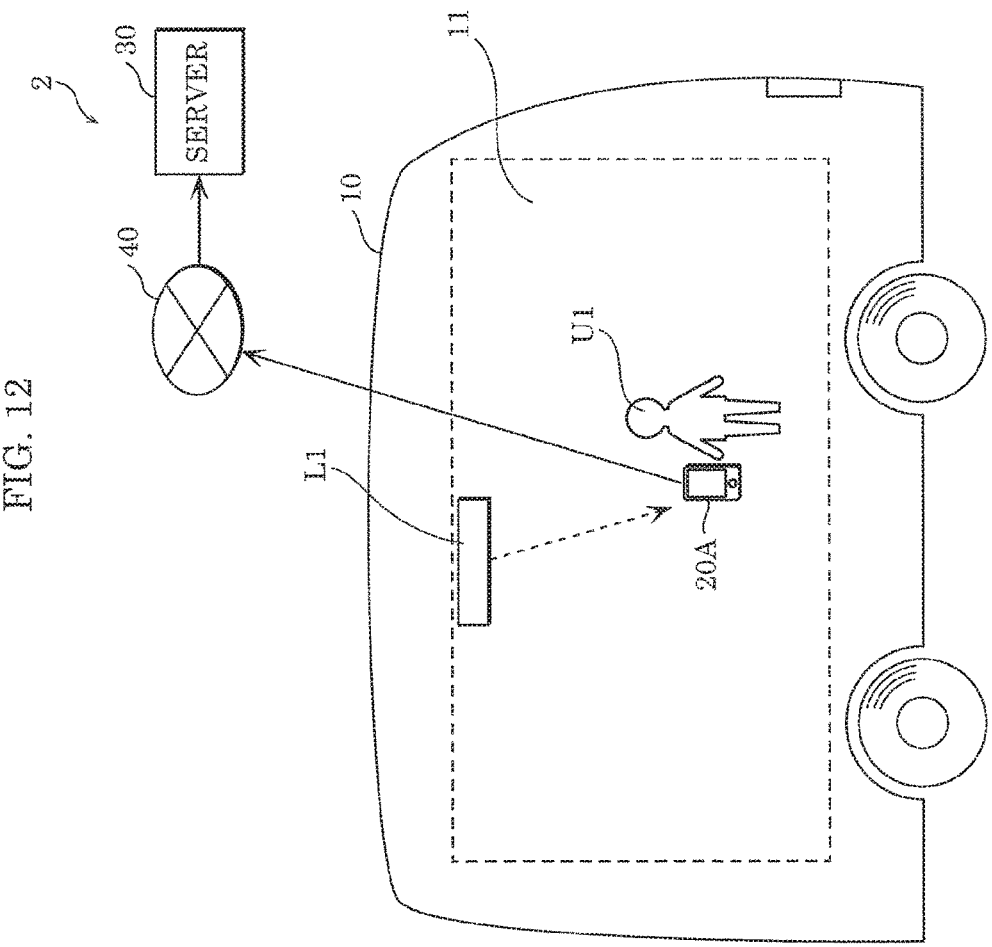
FIG. 12 is a conceptual diagram illustrating an information presenting system according to Embodiment 2.

FIG. 12 is a conceptual diagram illustrating information presenting system 2 according to the present embodiment.

As illustrated in FIG. 12, information presenting system 2 includes lighting apparatus L1 provided in passenger space 11 of bus 10, terminal 20A, and server 30. Terminal 20A and server 30 are connected via network 40 so as to communicate with each other.

Terminal 20A has a similar function to that of terminal 20 according to Embodiment 1, and furthermore transmits unique information received from lighting apparatus L1 to server 30 and presents, to user U1, special offer information (also referred to as predetermined information) received from server 30.

Server 30 is a server device which transmits special offer information to terminal 20A. Server 30 receives unique information from terminal 20A, and transmits special offer information to terminal 20A if the received unique information is authentic.

Network 40 connects terminal 20A and server 30 so that terminal 20A and server 30 can communicate with each other, and includes, for instance, a LAN, a mobile phone line network, and the Internet.

Figure 13:
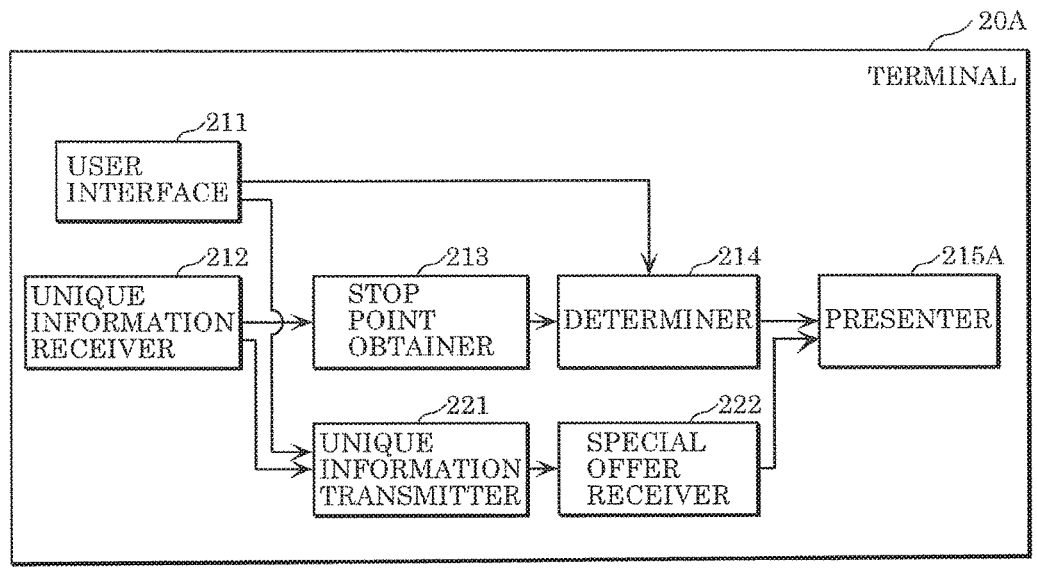
FIG. 13 is a block diagram illustrating a functional configuration of a terminal according to Embodiment 2.

FIG. 13 is a block diagram illustrating a functional configuration of terminal 20A according to the present embodiment.

As illustrated in FIG. 13, terminal 20A includes user interface 211, unique information receiver 212, stop point obtainer 213, determiner 214, presenter 215A, unique information transmitter 221, and special offer receiver 222. Note that among the functional blocks of terminal 20A, the same functional block as that of terminal 20 according to Embodiment 1 is given the same reference numeral, and thus a detailed description thereof is omitted.

Unique information transmitter 221 transmits, to server 30, unique information received by unique information receiver 212 from lighting apparatus L1. When unique information transmitter 221 transmits the above unique information to server 30, unique information transmitter 221 transmits, to server 30, an alighting point received by user interface 211, in addition to the above unique information.

Note that the unique information received by unique information receiver 212 of terminal 20A from lighting apparatus L1 is given signature information for determining whether the unique information is authentic. Here, "authentic" means that the unique information is indeed unique information generated by unique information generator 122, or in other words, the unique information is unique information not generated or altered by a third party different from unique information generator 122.

Special offer receiver 222 receives special offer information from server 30. Special offer information to be received by special offer receiver 222 is transmitted according to the result of determination as to whether unique information transmitted by unique information transmitter 221 is authentic which is made by server 30 based on the unique information and an alighting point.

Presenter 215A presents to user U1 or uses the special offer information received by special offer receiver 222. Presenter 215A presents, to user U1, alighting information notifying the user to alight from bus 10, as with presenter 215 according to Embodiment 1.

Figure 14:
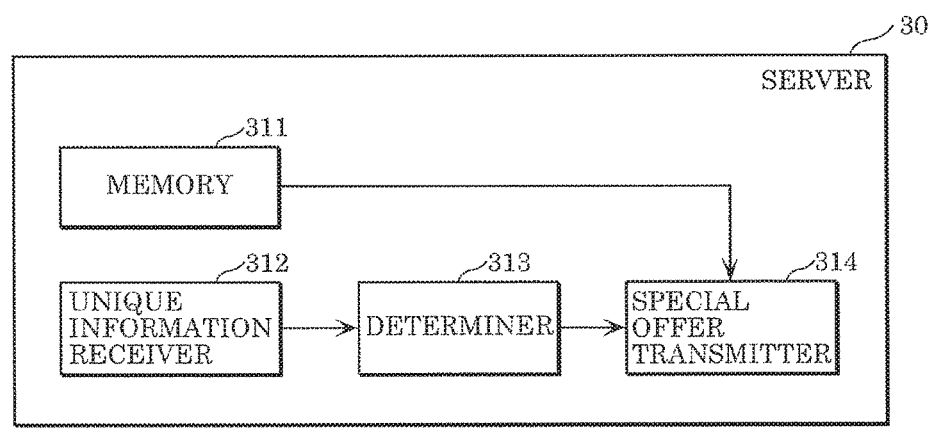
FIG. 14 is a block diagram illustrating a functional configuration of a server according to Embodiment 2.

FIG. 14 is a block diagram illustrating a functional configuration of server 30 according to the present embodiment.

As illustrated in FIG. 14, server 30 includes memory 311, unique information receiver 312, determiner 313, and special offer transmitter 314.

Memory 311 is a storage device which stores one or more pieces of special offer information associated with one or more of the predetermined boarding-and-alighting points at which bus 10 stops. Examples of such special offer information associated with one or more predetermined boarding-and-alighting points include, for instance, advertisement information of a store whose nearest bus stop is one of the boarding-and-alighting points, and authentication information for allowing a person to pass through a gate, which permits only an authorized person to enter a certain area, to go into the area.

Unique information receiver 312 receives unique information which is unique to bus 10 traveling along a route and specific to the location of bus 10, and an alighting point at which user U1 is to alight from bus 10. Unique information receiver 312 receives such unique information and such an alighting point from unique information transmitter 221 of terminal 20A.

Determiner 313 determines whether the unique information received by unique information receiver 312 is authentic. Various conventional techniques can be used to determine whether unique information is authentic. Determiner 313 may determine whether unique information is authentic, based on, for example, signature information given to the unique information.

If determiner 313 determines that unique information is authentic, special offer transmitter 314 transmits, among one or more pieces of special offer information stored in memory 311, special offer information associated with the alighting point received by unique information receiver 312.

The following describes in detail operation of terminal 20A and server 30 having the above configurations.

Figure 15:
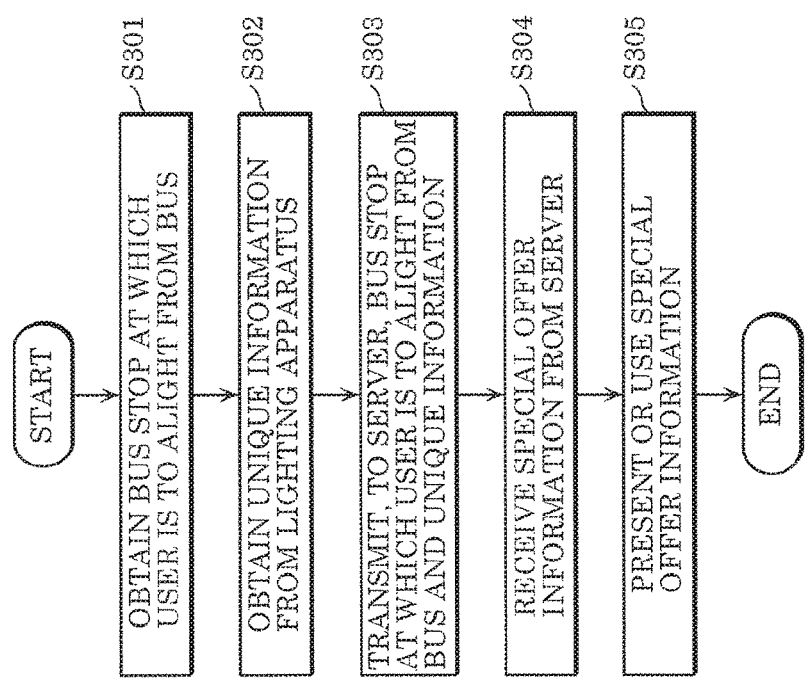
FIG. 15 is a flow chart illustrating processing by the terminal according to Embodiment 2.

FIG. 15 is a flow chart illustrating processing by terminal 20A according to the present embodiment.

In step S301, user interface 211 receives, as an alighting point, a bus stop at which user U1 is to alight from bus 10.

In step S302, unique information receiver 212 receives light which includes unique information in the form of a visible light communication signal from lighting apparatus L1, and obtains unique information from the received light.

In step S303, unique information transmitter 221 transmits, to server 30, the alighting point received in step S301 and unique information obtained in step S302 (point transmission step).

In step S304, special offer receiver 222 receives special offer information from server 30 (special offer receiving step). Special offer information received by special offer receiver 222 is transmitted by server 30 to terminal 20A, based on the alighting point and the unique information transmitted by unique information transmitter 221 in step S303.

In step S305, presenter 215A presents or uses the special offer information received in step S304 (presentation step). Aspects of presenting and using special offer information are later described using examples.

Figure 16:
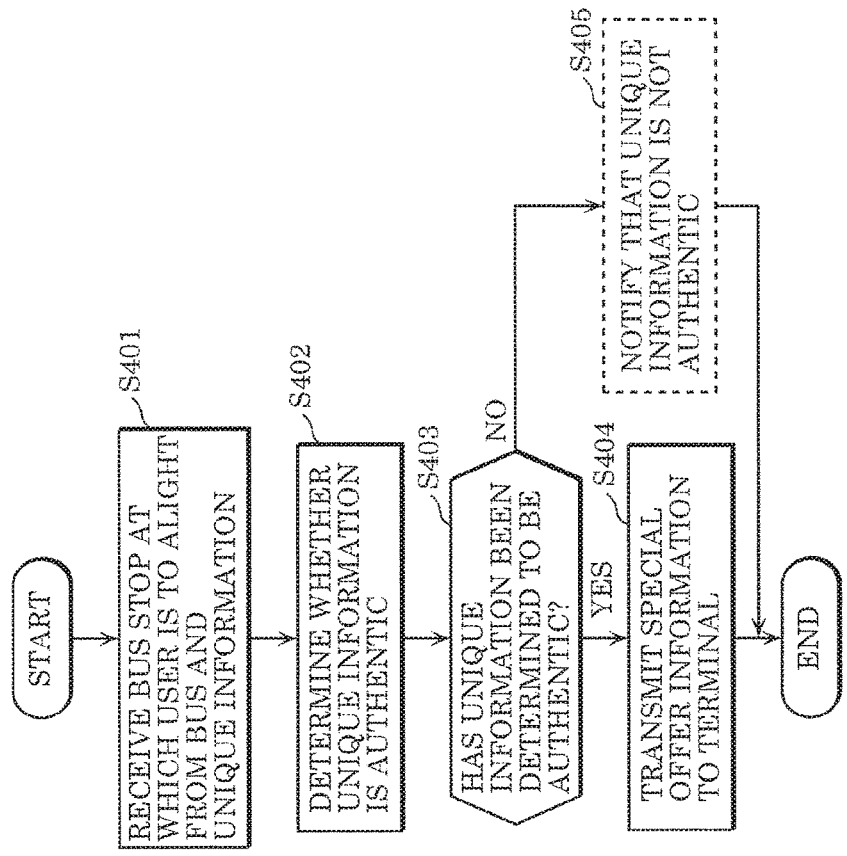
FIG. 16 is a flow chart illustrating processing by the server according to Embodiment 2.

FIG. 16 is a flow chart illustrating processing by server 30 according to the present embodiment.

In step S401, unique information receiver 312 receives the bus stop which is an alighting point at which user U1 is to alight from the bus and unique information from terminal 20A. The alighting point and the unique information are transmitted by unique information transmitter 221 of terminal 20A in step S303.

In step S402, determiner 313 determines whether the unique information received in step S401 is authentic (authenticity determination step). Specifically, determiner 313 determines whether the unique information received in step S401 is generated and transmitted by lighting apparatus L1.

In step S403, processing is branched according to the determination result in step S402. If determiner 313 determines the unique information to be authentic in step S402 (YES in step S403), the processing proceeds to step S404. On the other hand, if determiner 313 determines the unique information not to be authentic (NO in step S403), the processing proceeds to step S405.

In step S404, special offer transmitter 314 transmits special offer information to terminal 20A.

In step S405, determiner 313 notifies terminal 20A that the unique information is not authentic. Note that step S405 is not necessarily included and thus is not necessarily performed.

The following describes two specific examples of special offer information. A first example of special offer information is advertisement information (a so-called coupon), and a second example of special offer information is authentication information.

Figure 17:
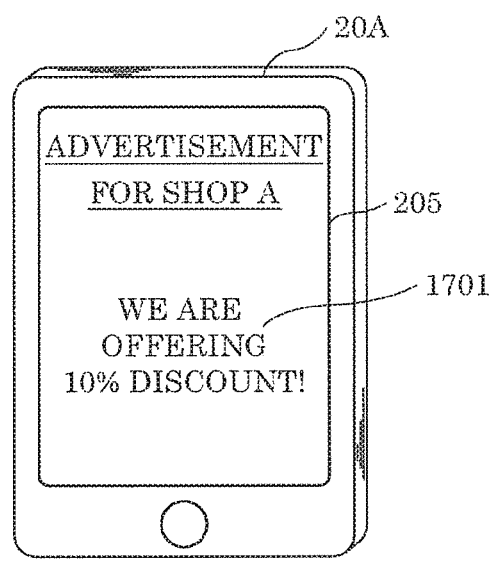
FIG. 17 is an explanatory diagram illustrating an example of presentation of advertisement information which is a first example of special offer information according to Embodiment 2.

FIG. 17 is an explanatory diagram illustrating an example of presenting advertisement information 1701 which is a first example of special offer information according to the present embodiment.

Advertisement information 1701 which is special offer information illustrated in FIG. 17 is displayed on display 205 of terminal 20A, and shows that user U1 can purchase a product at a lower price than the regular price at shop A which is a store whose nearest bus stop is a bus stop at which user U1 is to alight from the bus, for example.

User U1 is motivated to purchase a product at shop A by looking at advertisement information 1701. In purchasing a product at shop A, user U1 can use advertisement information 1701 to purchase the product at a lower price than the regular price by showing advertisement information 1701 to a salesperson at shop A.

Figure 18:
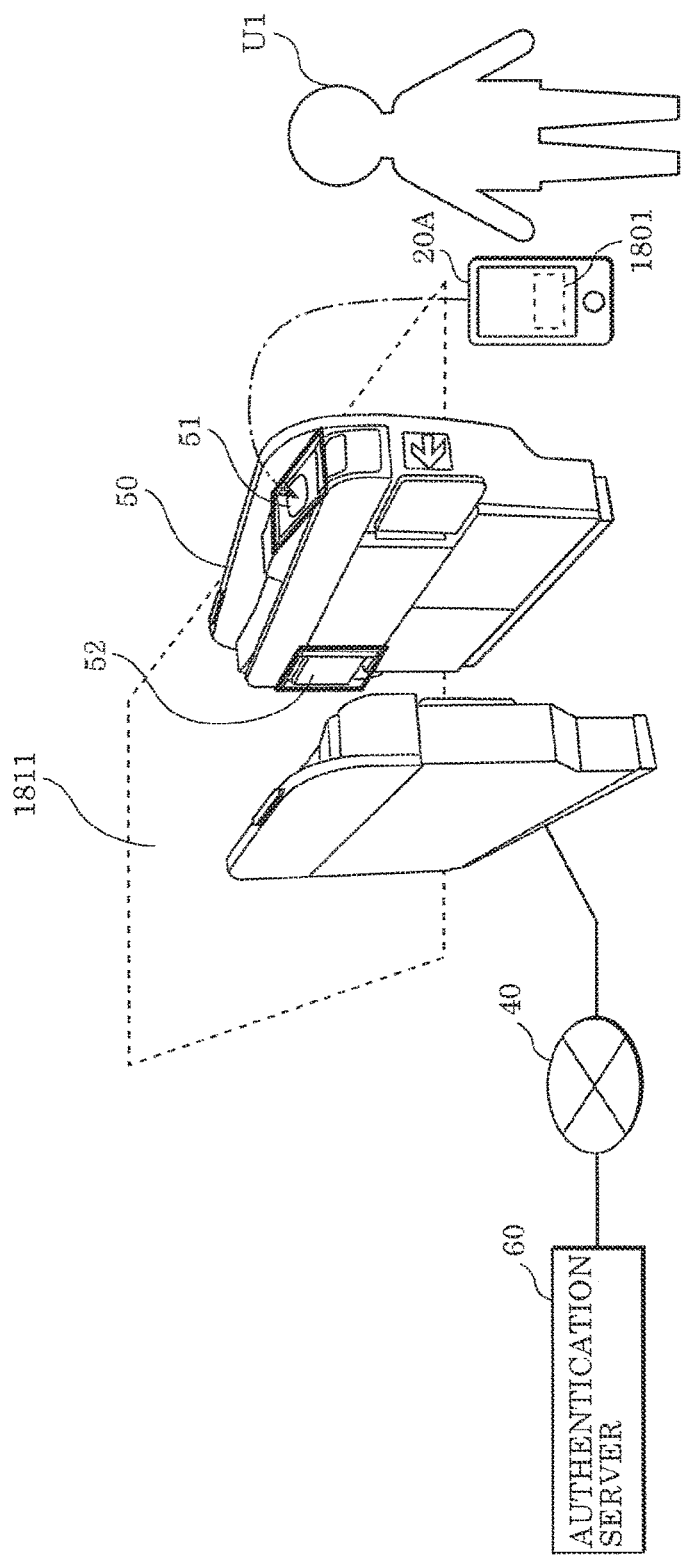
FIG. 18 is a conceptual diagram illustrating usage of authentication information, which is a second example of the special offer information in Embodiment 2.

FIG. 18 is a conceptual diagram illustrating usage of authentication information 1801 which is a second example of special offer information according to the present embodiment.

Authentication information 1801 illustrated in FIG. 18 as special offer information is stored in storage 202 of terminal 20A, and is for passing through gate 50 for entering area 1811 where only an authorized person is permitted to enter.

Gate 50 is connected to authentication server 60 via network 40 so as to communicate with authentication server 60. Gate 50 obtains authentication information 1801 from terminal 20A by near field radio communication for which NFC port 51 is used, and obtains the result of authenticating obtained authentication information 1801 by authentication server 60, thus opening and closing flapper(s) 52.

Specifically, if user U1 brings NFC port 209 of terminal 20A having authentication information 1801 near NFC port 51 of gate 50, gate 50 opens flapper(s) 52 and user U1 can enter area 1811. In contrast, if user U1 brings terminal 20A not having authentication information 1801 near NFC port 51 of gate 50 or does not bring anything near NFC port 51, gate 50 closes flapper(s) 52 and prevents user U1 from entering area 1811.

Figure 19:
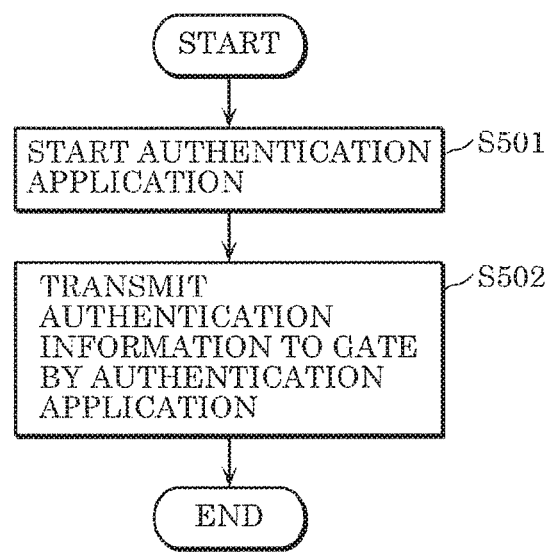
FIG. 19 is a flow chart illustrating processing performed by the terminal using authentication information according to Embodiment 2.

FIG. 19 is a flow chart illustrating processing performed by terminal 20A using authentication information 1801 according to the present embodiment.

In step S501, terminal 20A starts an authentication application. A program for the authentication application may be prestored in storage 202 of terminal 20A, or temporarily downloaded from a predetermined server device, for instance.

In step S502, bringing terminal 20A near NFC port 51 of gate 50 triggers the function of the authentication application to allow terminal 20A to transmit authentication information 1801 to gate 50.

Figure 20:
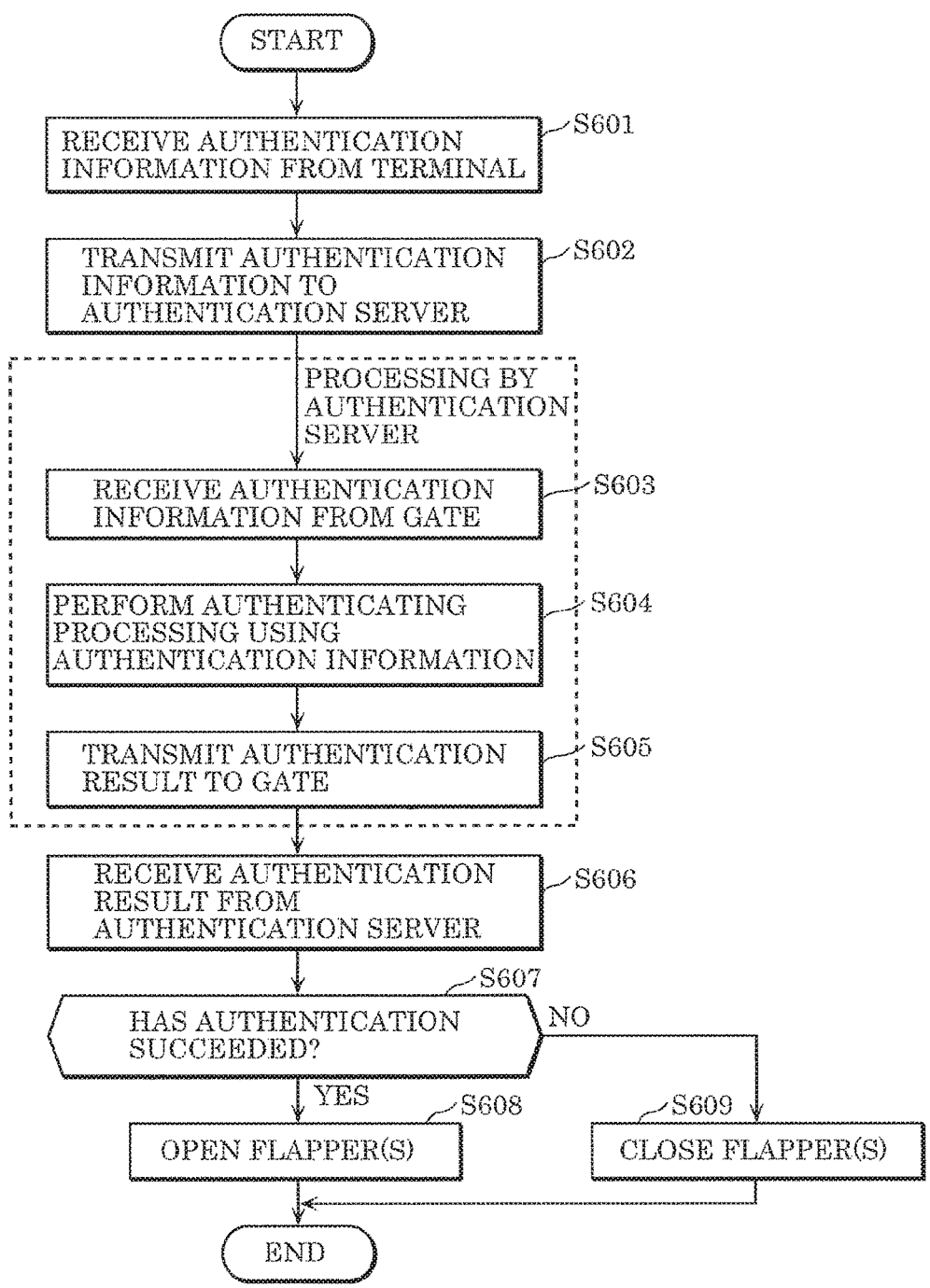
FIG. 20 is a flow chart illustrating processing performed by a gate and an authentication server using authentication information according to Embodiment 2.

FIG. 20 is a flow chart illustrating processing performed by gate 50 and authentication server 60 using authentication information 1801 according to the present embodiment.

In step S601, gate 50 receives authentication information 1801 from terminal 20A via NFC port 51. Authentication information 1801 received here is transmitted by terminal 20A in step S502.

In step S602, gate 50 transmits authentication information 1801 received in step S601 to authentication server 60.

In step S603, authentication server 60 receives authentication information 1801 from gate 50. Authentication information 1801 received here is authentication information 1801 transmitted by gate 50 in step S602.

In step S604, authentication server 60 performs authenticating processing using authentication information 1801. This authenticating processing determines whether authentication information 1801 is authentication information of a person authorized to enter area 1811. If authenticating processing determines authentication information 1801 to be authentication information of a person authorized to enter area 1811, authentication server 60 generates an authentication result indicating that authentication has succeeded. On the other hand, if authenticating processing determines authentication information 1801 not to be authentication information of a person authorized to enter area 1811. Authentication server 60 generates an authentication result indicating that authentication has failed.

In step S605, authentication server 60 transmits, to gate 50, an authentication result obtained by authenticating processing in step S604.

In step S606, gate 50 receives the authentication result transmitted by authentication server 60 in step S605.

In step S607, the processing performed by gate 50 proceeds to step S608 if the authentication result indicates that authentication has succeeded (YES in step S607). On the other hand, if the authentication result indicates that authentication has failed (NO in step S607), the processing proceeds to step S609.

In step S608, gate 50 opens flapper(s) 52. Accordingly, user U1 can pass through gate 50, and enter area 1811.

In step S609, gate 50 closes flapper(s) 52. Accordingly, gate 50 can prevent user U1 from passing through gate 50 and entering area 1811.

Through a series of the above processes, gate 50 allows only user U1 carrying terminal 20A that has authentication information 1801 as unique information to enter area 1811.

Note that using unique information and an alighting point received by unique information receiver 312, server 30 may analyze actions of users of bus 10, that is, users U1 of bus 10, and provide the analysis result to the outside. Specifically, if unique information receiver 312 receives alighting points from terminals 20A of users U1, server 30 may estimate, by analyzing the received alighting points, alighting points and times at which the users are to alight from bus 10, and the numbers of users who are to alight from bus 10 at the alighting points. A person provided with the analysis result of the actions can use such an analysis result to provide the users with some service at the alighting times and the alighting points.

As described above, an information presenting method according to the present embodiment is an information presenting method for presenting information to user U1 on bus 10 which stops at predetermined boarding-and-alighting points, the information presenting method including: (a) emitting, by lighting apparatus L1 provided in bus 10, light to passenger space 11 of bus 10, the light including, in form of a visible light communication signal, unique information which is unique to bus 10 and specific to a location of bus 10; (b) receiving in passenger space 11, by terminal 20A carried by user U1, the light emitted in (a) to obtain the unique information included in the received light; (c) obtaining, among the predetermined boarding-and-alighting points, one or more stop points at which bus 10 is currently stopped or is to subsequently stop, the one or more stop points being derived from the obtained unique information; (d) receiving an alighting point at which user U1 is to alight from bus 10; (e) determining whether the alighting point is included in the one or more stop points; and (f) presenting, to user U1 via terminal 20A, alighting information notifying user U1 to alight from bus 10, when the alighting point is determined to be included in the one or more stop points in (e).

The information presenting method may further include: (g) transmitting the unique information obtained in (b) and the alighting point received in (d) to server 30 storing one or more pieces of special offer information associated in advance with one or more of the predetermined boarding-and-alighting points; and (h) receiving, from server 30, special offer information associated with the alighting point transmitted in (g) among the one or more pieces of special offer information stored in server 30, wherein in (f), the special offer information received in (h) is presented to user U1 in addition to the alighting information.

The information presenting method may further include: (i) determining whether the unique information transmitted in (g) is authentic, wherein in (h), receiving the special offer information associated with the alighting point transmitted in (g) among the one or more pieces of special offer information stored in the server is received from the server, when the unique information is determined to be authentic in (i).

According to this, information presenting system 2 presents to user U1 special offer information associated with a point at which user U1 is to alight from bus 10. User U1 receives presentation of alighting information and also presentation of special offer information, which enhances convenience for the user.

In (d), alighting points at which users including user U1 are to alight from bus 10 may be received, in (b), the unique information included in the light emitted in (a) may be obtained by each of terminals 20A carried by the users including user U1, and in (g), the unique information obtained by each of terminals 20A in (b) and the alighting points received in (d) may be transmitted to server 30, and the information presenting method may further include: (j) by analyzing the transmitted alighting points, estimating, for each of the predetermined boarding-and-alighting points, an alighting time for a user to alight from bus 10 and the number of users who are to alight from bus 10 at the predetermined boarding-and-alighting point: and (k) outputting the alighting times and the numbers of users who are to alight from bus 10 estimated in (j).

According to this, a person who receives, from information presenting system 2, output of alighting times and the numbers of persons who are to alight from bus 10 at the predetermined boarding-and-alighting spots can obtain information indicating where and about how many users are to alight from bus 1 in the future, which gives the person an advantage that he/she can take appropriate action according to this information.

Server 30 includes: memory 311 storing one or more pieces of special offer information associated with one or more of predetermined boarding-and-alighting points at which bus 10 stops; unique information receiver 312 which receives unique information which is unique to bus 10 and specific to a location of bus 10, and an alighting point at which user U1 is to alight from bus 10; determiner 313 which determines whether the unique information received by unique information receiver 312 is authentic; and special offer transmitter 314 which transmits, among the one or more pieces of special offer information, special offer information associated with the alighting point received by unique information receiver 312, when determiner 313 determines the unique information to be authentic.

Embodiment 3

The present embodiment describes a technique of appropriately transmitting unique information to a passenger by a plurality of lighting apparatuses, with an information presenting system and an information presenting method which appropriately present alighting information to the passenger. Note that the present embodiment is not limited to the above embodiments, and can be achieved as a system which appropriately presents, to a terminal, predetermined information with a plurality of lighting apparatuses. Note that the same numeral is given to the same element as an element in the above embodiments, and a detailed description thereof may be omitted.

First, a situation which may be caused by the information presenting systems according to the above embodiments is described.

Passenger space 11 of bus 10 typically has a size sufficient for tens of users to board (see FIG. 1). Accordingly, in order to illuminate the entirety of passenger space 11 sufficiently bright, just one lighting apparatus L1 may be insufficient, and a plurality of lighting apparatuses may be needed.

In view of this, if a plurality of lighting apparatuses are simply provided in passenger space 11 in the above embodiments, the lighting apparatuses each transmit light which includes a visible light communication signal. Terminal 20 receives light emitted by each of the lighting apparatuses. The amplitude of light which terminal 20 receives at this time is a total of the amplitudes of light transmitted by the lighting apparatuses. Typically, the phases of light emitted by the alighting apparatuses do not completely match so that phase shift occurs, and thus it is difficult to separate and obtain, from the received light, visible light communication signals transmitted by the lighting apparatuses.

As described above, if a plurality of lighting apparatuses each emit light which includes a visible light communication signal, a situation may occur in which terminal 20 cannot obtain the visible light communication signals transmitted by the lighting apparatuses. The information presenting system according to the present embodiment allows terminal 20 to appropriately obtain visible light communication signals, by adjusting timings at which the lighting apparatuses are to emit light which includes a visible light communication signal.

The following describes the information presenting system according to the present embodiment.

Figure 21:
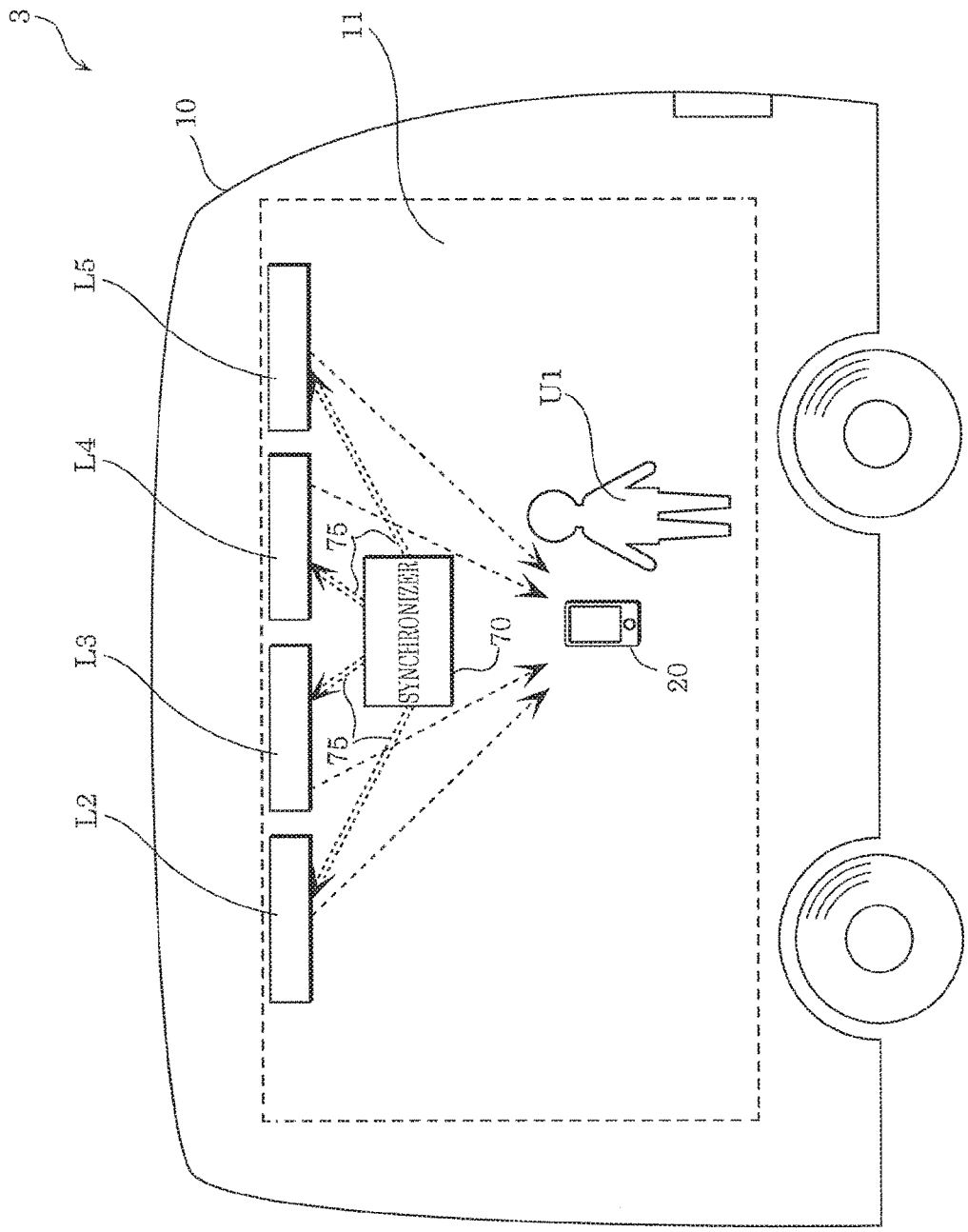
FIG. 21 is a conceptual diagram illustrating an information presenting system according to Embodiment 3.

FIG. 21 is a conceptual diagram illustrating information presenting system 3 according to the present embodiment.

As illustrated in FIG. 21, information presenting system 3, lighting apparatuses L2, L3, L4, and L5 (hereinafter may be referred to as lighting apparatuses L2 to L5) provided in passenger space 11 of bus 10, synchronizer 70, and terminal 20.

As with lighting apparatus L1 according to Embodiment 1, each of lighting apparatuses L2 to L5 is a lighting apparatus for visible light communication, and emits light which includes a visible light communication signal in passenger space 11. The light emitted by each of lighting apparatuses L2 to L5 is the same as the light emitted by lighting apparatus L1 according to Embodiment 1, yet the timings at which the lighting apparatuses emit light are controlled based on beacon 75 transmitted by synchronizer 70.

Synchronizer 70 is a device for synchronizing lighting apparatuses L2 to L5 by transmitting beacon 75 based on which timings at which lighting apparatuses L2 to L5 are to emit light are determined. In the space where lighting apparatuses L2 to L5 are disposed, synchronizer 70 transmits beacon 75 by radio waves. The following describes the case where synchronizer 70 is provided as a separate device from lighting apparatuses L2 to L5, yet one or more of lighting apparatuses L2 to L5 may be configured to function as synchronizer 70.

Next, detailed configurations of synchronizer 70 and lighting apparatus L2 are described.

Figure 22A:
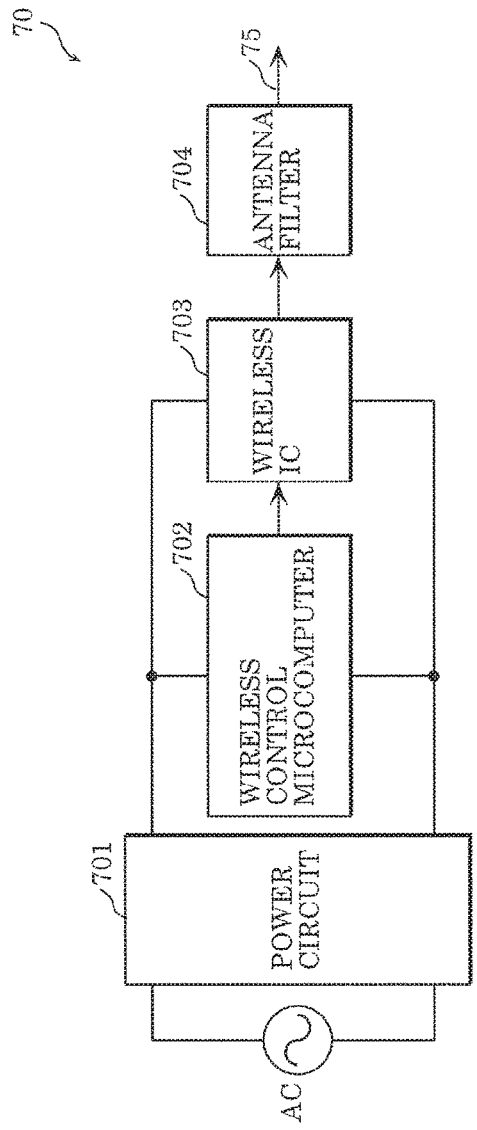
FIG. 22A is a block diagram illustrating a hardware configuration of a synchronizer according to Embodiment 3.
Figure 22B:
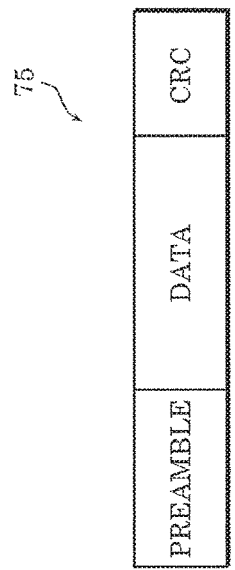
FIG. 22B is a block diagram illustrating a hardware configuration of a wireless control microcomputer of the synchronizer according to Embodiment 3.
Figure 23:
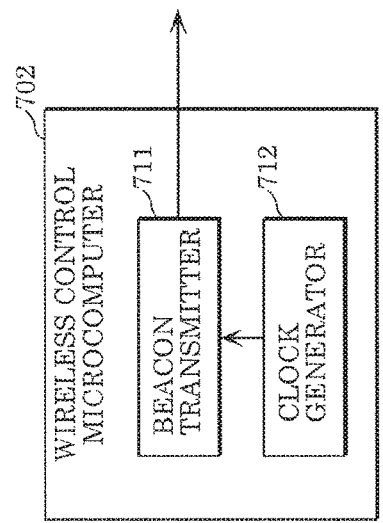
FIG. 23 is an explanatory diagram illustrating information described in a radio beacon according to Embodiment 3.

FIG. 22A is a block diagram illustrating a hardware configuration of synchronizer 70 according to the present embodiment. FIG. 22B is a block diagram illustrating a hardware configuration of wireless control microcomputer 702 of synchronizer 70 according to the present embodiment. FIG. 23 is an explanatory diagram illustrating information described in beacon 75 according to the present embodiment.

As illustrated in FIG. 22A, synchronizer 70 includes power circuit 701, wireless control microcomputer 702, wireless IC 703, and antenna filter 704.

Power circuit 701 supplies power for driving wireless control microcomputer 702 and wireless IC 703.

Wireless control microcomputer 702 generates an original signal of beacon 75, and provides wireless IC 703 with the original signal. Wireless control microcomputer 702 includes beacon transmitter 711 and clock generator 712 (FIG. 22B). Beacon transmitter 711 generates an original signal of beacon 75 for determining timings at which lighting apparatuses L2 to L5 are to transmit light which includes unique information, and provides wireless IC 703 with the original signal. Wireless control microcomputer 702 obtains a clock signal generated by clock generator 712, and repeatedly generates the above original signal per fixed period based on the obtained clock signal. This fixed period can be a period of 30 seconds, for example. Setting the period to 30 seconds satisfies the regulation of the radio law about a time for consecutive output and an integration time of the consecutive output per hour Clock generator 712 generates a clock signal per fixed period, and provides beacon transmitter 711 with the clock signal.

Beacon 75 has fields, namely, a preamble, data, and cyclic redundancy check (CRC), as illustrated in FIG. 23. A preamble is a bit string of a predetermined pattern disposed at the head portion of a signal transmitted. Data is a portion which includes information that beacon 75 carries, and an identifier indicating that this signal is beacon 75. CRC is information for error correction.

Radio IC 703 is a circuit which obtains an original signal of beacon 75 from wireless control microcomputer 702, and transmits beacon 75 by radio waves using antenna filter 704.

Antenna filter 704 includes a band pass filter and an antenna circuit which transmits, to the surroundings, a signal transmitted by wireless IC 703 in the form of a radio wave. Beacon 75 is transmitted by specified low power radio broadcasting, for example. Note that the standard of wireless communication is not limited to the above.

Figure 24:
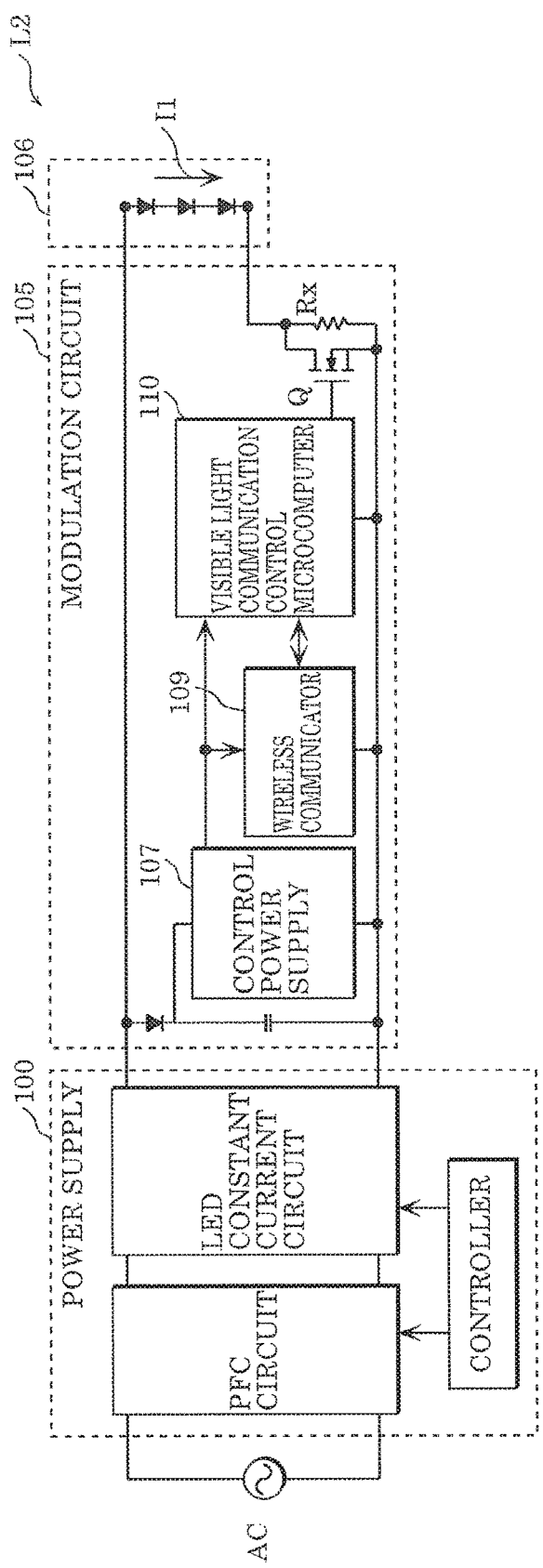
FIG. 24 is a block diagram illustrating a hardware configuration of a lighting apparatus according to Embodiment 3.
Figure 25:
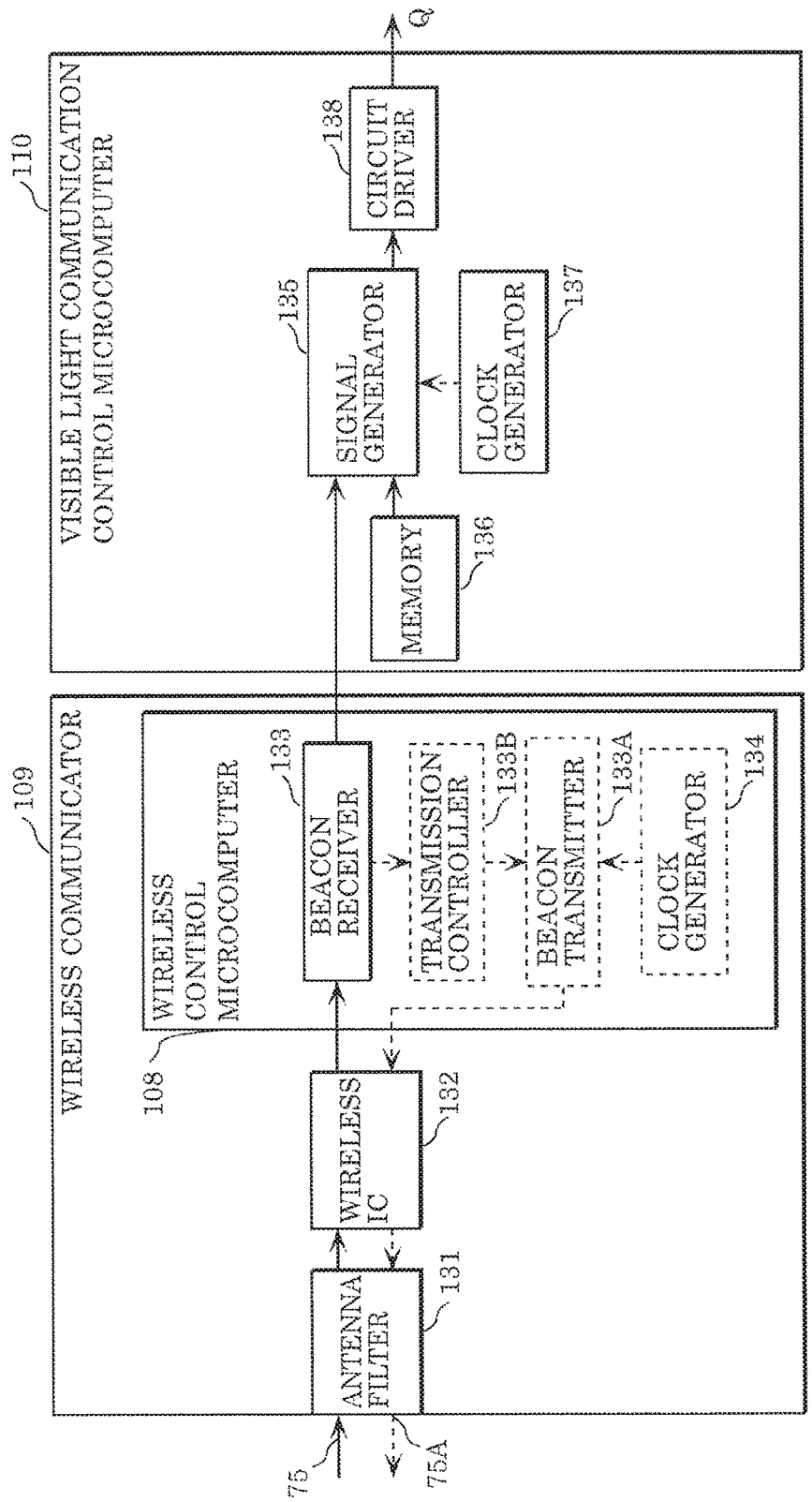
FIG. 25 is a block diagram illustrating a detailed hardware configuration of the lighting apparatus according to Embodiment 3.

FIG. 24 is a block diagram illustrating a hardware configuration of lighting apparatus L2 according to the present embodiment. FIG. 25 is a block diagram illustrating a detailed hardware configuration of lighting apparatus L2 according to the present embodiment. Note that each of lighting apparatuses L3, L4, and L5 also has a similar hardware configuration to that of lighting apparatus L2.

As illustrated in FIG. 24, lighting apparatus L2 includes power supply 100, modulation circuit 105, and light source 106.

Power supply 100 is a power circuit which receives a supply of power from an external power supply, and supplies power to modulation circuit 105 and light source 106, for instance. In power supply 100, a power factor correction (PFC) circuit (power factor improvement circuit) and an LED constant current circuit generate a constant current, and a controller adjusts the amount of the generated constant current.

Modulation circuit 105 modulates the amplitude of light emitted by light source 106, by modulating value I of a current supplied to light source 106. Modulation circuit 105 includes control power supply 107, wireless communicator 109, and visible light communication control microcomputer 110.

Control power supply 107 is a power circuit (more specifically, a DC/DC converter) which receives a supply of power from power supply 100, and supplies power to a circuit, a microcomputer, and others in modulation circuit 105.

Wireless communicator 109 is a wireless interface which receives (or transmits and receives) a radio signal. Specifically, wireless communicator 109 receives beacon 75 transmitted by synchronizer 70.

Wireless communicator 109 includes antenna filter 131, wireless IC 132, and wireless control microcomputer 108 (FIG. 25). Antenna filter 131 includes a band pass filter and an antenna circuit which transmits, to the surroundings, a signal transmitted by wireless IC 132, in the form of a radio wave. Wireless IC 132 is a circuit which provides wireless control microcomputer 108 with beacon 75 received via antenna filter 131.

Wireless control microcomputer 108 obtains beacon 75 received by wireless IC 132, and controls visible light communication control microcomputer 110 based on obtained beacon 75.

Wireless control microcomputer 108 includes beacon receiver 133. Beacon receiver 133 obtains beacon 75 from wireless IC 132, and verifies by cyclic redundancy check (CRC) whether obtained beacon 75 has been received without error. If beacon 75 has been received without error, wireless control microcomputer 108 transmits a synchronous signal to visible light communication control microcomputer 110.

Visible light communication control microcomputer 110 modulates a value of a current to be supplied to light source 106. Visible light communication control microcomputer 110 includes signal generator 135, memory 136, clock generator 137, and circuit driver 138.

Signal generator 135 generates an original signal of a signal to be transmitted by visible light communication.

Memory 136 is a storage device which stores a group identifier indicating a group to which lighting apparatus L2 belongs, and a time slot associated with the group identifier. As long as the group identifier identifies one group among other groups, any type of a group identifier may be used. Here, group identifiers are "A", "B", "C", and "D", and a group identified by group identifier "A" is referred to as group A. The same applies to other groups. Note that one or more lighting apparatuses may belong to one group.

A time slot indicates a period in which a lighting apparatus belonging to a group associated with the time slot transmits light which includes a visible light communication signal. For example, a time slot in which group A transmits light which includes a visible light communication signal may be a period having time width Tf from a reference time, and a time slot in which group B transmits light which includes a visible light communication signal may be a period having time width Tf following the period having time width Tf.

Similarly, time slots for groups C and D may be periods having time width Tf in sequence.

The following describes an example in which lighting apparatus L2 belongs to group A indicated by group identifier "A", and lighting apparatuses L3, L4, and L5 belong to groups B, C, and D indicated by group identifiers "B", "C", and "D", respectively.

Clock generator 137 generates a clock pulse for operation of visible light communication control microcomputer 110.

Signal generator 135 generates an original signal at an appropriate timing using the clock pulse generated by clock generator 137 and the group identifier stored in memory 136.

Circuit driver 138 is a drive circuit which obtains an original signal generated by signal generator 135 and applies a voltage according to the amplitude of the obtained original signal to a field effect transistor (FET) Q, thus controlling value I of the current flowing into light source 106.

Note that wireless control microcomputer 108 may further include beacon transmitter 133A and clock generator 134. Beacon transmitter 133A and clock generator 134 have the same functions as beacon transmitter 711 and clock generator 712 of wireless control microcomputer 702, respectively. In this case, beacon transmitter 133A generates an original signal of beacon 75A and transmits beacon 75A using wireless IC 132 and antenna filter 131, which allows lighting apparatus L2 to function as synchronizer 70.

The following describes processing by synchronizer 70 and lighting apparatuses L2 to L5 having the configurations as described above.

Figure 26:
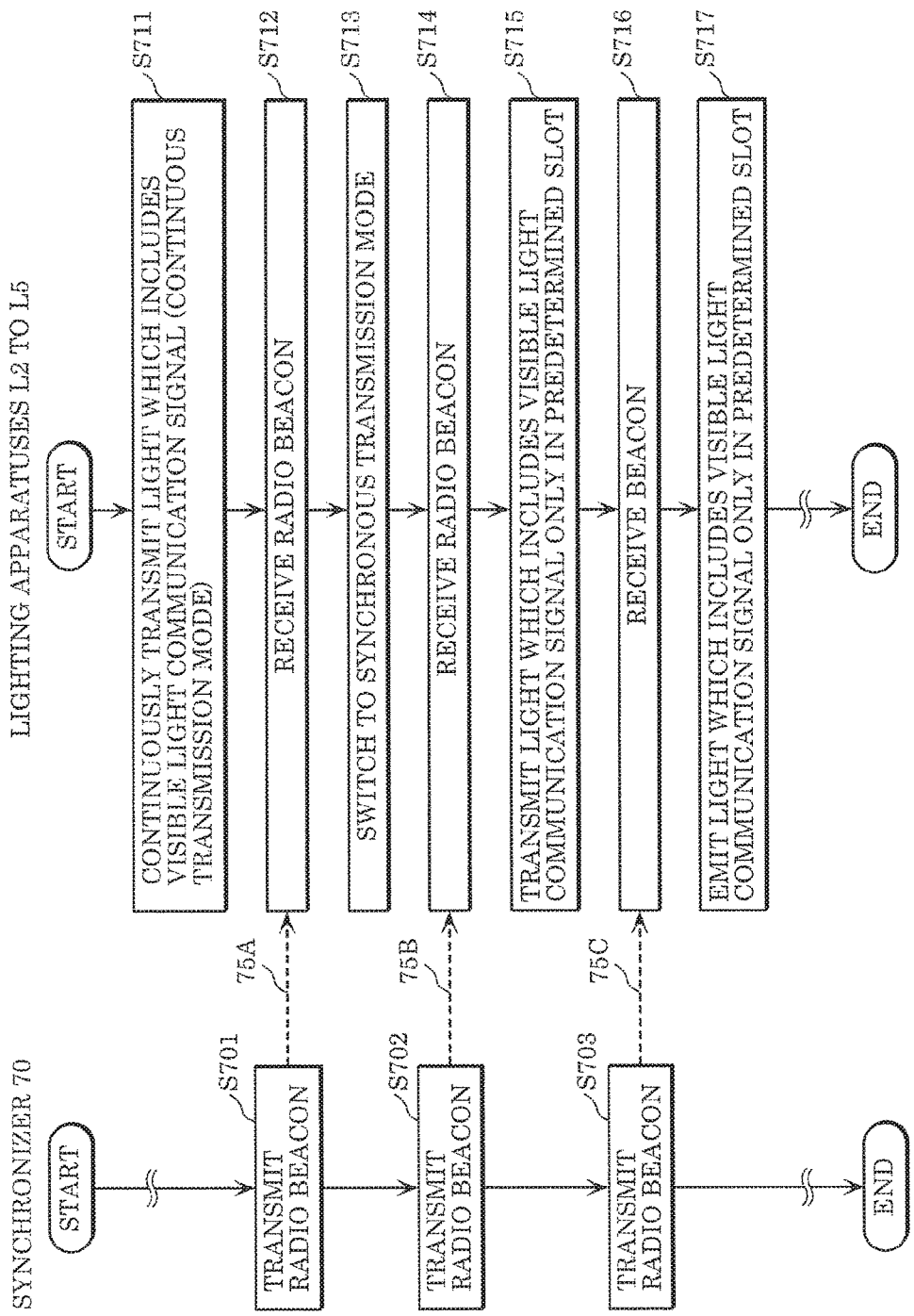
FIG. 26 is a flow chart illustrating processing of transmitting a radio beacon by the synchronizer and processing of transmitting a visible light communication signal by the lighting apparatus according to Embodiment 3.
Figure 27:
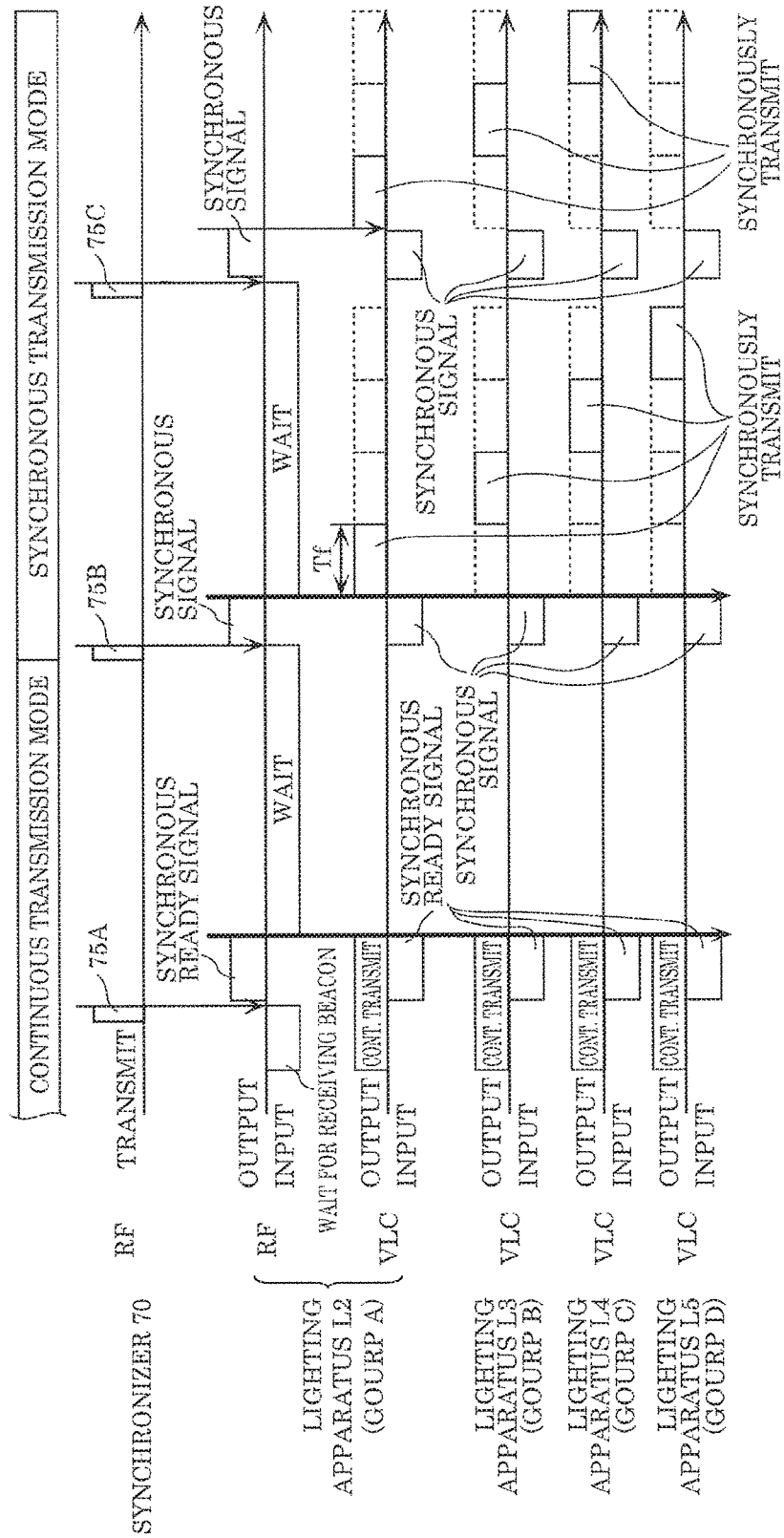
FIG. 27 is a timing diagram illustrating timings when the lighting apparatus transmits information according to Embodiment 3.

FIG. 26 is a flow chart illustrating processing which includes transmission of a radio beacon by synchronizer 70 and transmission of visible light communication signals by lighting apparatuses L2 to L5, according to the present embodiment. FIG. 27 is a timing diagram illustrating timings at which lighting apparatuses L2 to L5 transmit information, according to the present embodiment. In FIG. 27, "RF" means a radio signal and "VLC" means a visible light communication signal.

In step S701, synchronizer 70 transmits beacon 75A. Beacon 75A corresponds to beacon 75 as described above, and so do beacons 75B and 75C described below. After transmitting beacon 75A, synchronizer 70 waits until a predetermined period elapses for each of beacons 75B and 75C, and sequentially transmits beacons 75B and 75C (steps S702 and S703).

In step S711, lighting apparatus L22 has not received any beacon 75 from synchronizer 70. In this state, lighting apparatus L2 is continuously transmitting light which includes a visible light communication signal. Such an operation mode may be referred to as a continuous transmission mode. Lighting apparatus L2 waits to receive beacon 75 from synchronizer 70.

In step S712, lighting apparatus L2 receives beacon 75A.

In step S713, lighting apparatus L2 switches an operation mode from the continuous transmission mode to a synchronous transmission mode, being triggered by the reception of beacon 75A in step S712. The synchronous transmission mode is an operation mode in which being triggered by the reception of beacon 75 from synchronizer 70, lighting apparatus L2 emits light which includes a visible light communication signal only in a predetermined period after a predetermined time has elapsed since the time when beacon 75 is received. Lighting apparatus L2 waits to receive next beacon 75 from synchronizer 70.

In step S714, lighting apparatus L2 receives beacon 75B.

Being triggered by the reception of beacon 75B in step S714, lighting apparatus L2 transmits, in step S715, light which includes a visible light communication signal only in a time slot determined based on the time when beacon 75B is received. Specifically, being triggered by the reception of beacon 75B, wireless communicator 109 of lighting apparatus L2 transmits a synchronous signal to visible light communication control microcomputer 110. Visible light communication control microcomputer 110 receives the synchronous signal, and determines a time slot in which lighting apparatus L2 emits light which includes a visible light communication signal, based on the group identifier and the time slot stored in memory 136. Circuit driver 138 modulates value I of the current flowing into light source 106, only in the determined time slot. As a result, lighting apparatuses L2 to L5 emit light which includes a visible light communication signal one by one in different periods for the groups to which lighting apparatuses L2 to L5 belong.

In step S716, lighting apparatus L2 receives beacon 75C.

Being triggered by the reception of beacon 75C in step S716, lighting apparatus L2 emits, in step S717, light which includes a visible light communication signal only in a time slot determined based on the time when beacon 75C is received. Detailed processing of step S717 is the same as that of step S714, and thus a detailed description thereof is omitted.

Note that a description has been given with reference to FIG. 27, assuming the case where lighting apparatuses L2 to L5 each transmit one synchronous signal, being triggered by the transmission of one beacon 75 from synchronizer 70. Yet, synchronizer 70 may intermittently transmit beacon 75. Specifically, synchronizer 70 may transmit beacons 75 at intervals of about 10 times the intervals of transmitting radio beacons illustrated in FIG. 27. In this case, if lighting apparatuses L2 to L5 receive beacon 75, lighting apparatuses L2 to L5 each transmit a synchronous signal, based on received beacon 75, and thereafter each repeatedly transmit a synchronous signal even if lighting apparatuses L2 to L5 do not receive beacon 75. This achieves a reduction in power consumption of synchronizer 70. In this manner, synchronizer 70 may be driven by, for example, a dry cell, without the supply of power from, for instance, a system power supply for several years.

Note that one or more lighting apparatuses among lighting apparatuses L2 to L5 may each further include beacon transmitter 133A (FIG. 25). Beacon transmitter 133A of each of the one or more lighting apparatuses may include transmission controller 133B which starts transmitting beacon 75 when beacon 75 is not received for a predetermined time from the outside of the lighting apparatus. In this manner, even if synchronizer 70 has some problem, one of the lighting apparatuses operates as synchronizer 70, thus allowing each of the lighting apparatuses to adjust a timing at which the lighting apparatus is to emit light which includes a visible light communication signal.

Note that lighting apparatuses L2 to L5 may each include a radio beacon transmitter (not illustrated) which transmits, by a radio wave, a terminal beacon which is to be received by terminal 20, based on a timing at which beacon receiver 133 has received beacon 75. A terminal beacon is a signal which includes unique information of each of lighting apparatuses L2 to L5. An example of the communication standard adopted to transmit a terminal beacon is Bluetooth (registered trademark) Low Energy (BLE), yet the communication standard is not limited to this.

As described above, information presenting system 3 according to the present embodiment is information presenting system 3 which presents information to user 1 on bus 10 which stops at predetermined boarding-and-alighting points, information presenting system 3 including: a lighting apparatus such as lighting apparatus L2 provided in bus 10; and terminal 20 carried by user 1, wherein the lighting apparatus includes unique information transmitter 123 which emits light to passenger space 11 of bus 10, the light including, in form of a visible light communication signal, unique information which is unique to bus 10 and specific to a location of bus 10, and terminal 20 includes: unique information receiver 212 which receives, in passenger space 11, the light emitted by unique information transmitter 123, and obtains the unique information included in the received light; stop point obtainer 213 which obtains, among the predetermined boarding-and-alighting points, one or more stop points at which bus 10 is currently stopped or is to subsequently stop, the one or more stop points being derived from the obtained unique information; user interface 211 which receives input of an alighting point at which user 1 is to alight from bus 10; determiner 214 which determines whether bus 10 is near the alighting point, by comparing the one or more stop points and the alighting point; and presenter 215 which presents, to user 1, alighting information indicating that bus 10 is near the alighting point, when determiner 214 determines bus 10 to be near the alighting point.

Information presenting system 3 further includes beacon transmitter 711 which transmits, to the lighting apparatus which is, for instance, lighting apparatus L2, beacon 75 for determining a timing at which the lighting apparatus is to emit the light which includes the unique information, wherein the lighting apparatus includes: light source 106; power supply 100 which supplies a current for causing light source 106 to emit light; beacon receiver 133 which receives beacon 75 from beacon transmitter 711; and modulation circuit 105 which causes light source 106 to emit light which includes a visible light communication signal, by modulating a value of the current to be supplied to light source 106, based on a time when beacon receiver 133 receives beacon 75.

According to this, information presenting system 3 can control, based on beacon 75 transmitted by synchronizer 70, a timing at which a lighting apparatus transmits light which includes a visible light communication signal.

Lighting apparatuses including lighting apparatus L2 which are divided into groups may be provided, each of the lighting apparatuses being the lighting apparatus, and beacon transmitter 711 may transmit beacon 75 to the lighting apparatuses including lighting apparatus L2 and belonging to the groups.

According to this, if information presenting system 3 includes a plurality of lighting apparatuses, information presenting system 3 can cause the lighting apparatuses to transmit light which includes a visible light communication signal, one by one. Accordingly, information presenting system 3 can appropriately present alighting information to a passenger.

At least one of the lighting apparatuses including lighting apparatus L2 may include: beacon transmitter 133A; and transmission controller 133B which causes beacon transmitter 133A to start transmitting beacon 75 when a predetermined period has elapsed without beacon receiver 133 receiving beacon 75 from outside the lighting apparatus.

According to this, if a device which is to transmit beacon 75 in information presenting system 3 stops transmitting beacon 75, one of lighting apparatuses L2 to L5 starts transmitting beacon 75, thus causing lighting apparatuses L2 to L5 to appropriately emit light which includes a visible light communication signal, one by one.

Information presenting system 3 may further include synchronizer 70 which is a separate device from the lighting apparatuses including lighting apparatus L2, and includes beacon transmitter 711.

According to this, synchronizer 70 which is a separate device from lighting apparatuses L2 to L5 in information presenting system 3 can cause lighting apparatuses L2 to L5 to emit light which includes a visible light communication signal, one by one.

The lighting apparatus which is, for instance, lighting apparatus L2 may further include a radio beacon transmitter which transmits, by a radio wave, a terminal beacon to be received by terminal 20, based on the time when beacon receiver 133 receives beacon 75.

According to this, lighting apparatuses L2 to L5 in information presenting system 3 can transmit predetermined information to terminal 20 by radio waves. Accordingly, even when terminal 20 cannot receive light (for example, when terminal 20 is under the clothing of user U1), terminal 20 is allowed to receive information.

Variation 1 of Embodiment 3

This variation describes a first technique of further reliably synchronizing a plurality of lighting apparatuses, with the information presenting system and the information presenting method according to Embodiment 3. Note that the same numeral may be given to the same element as that of the above embodiments, and a detailed description thereof may be omitted.

Figure 28:
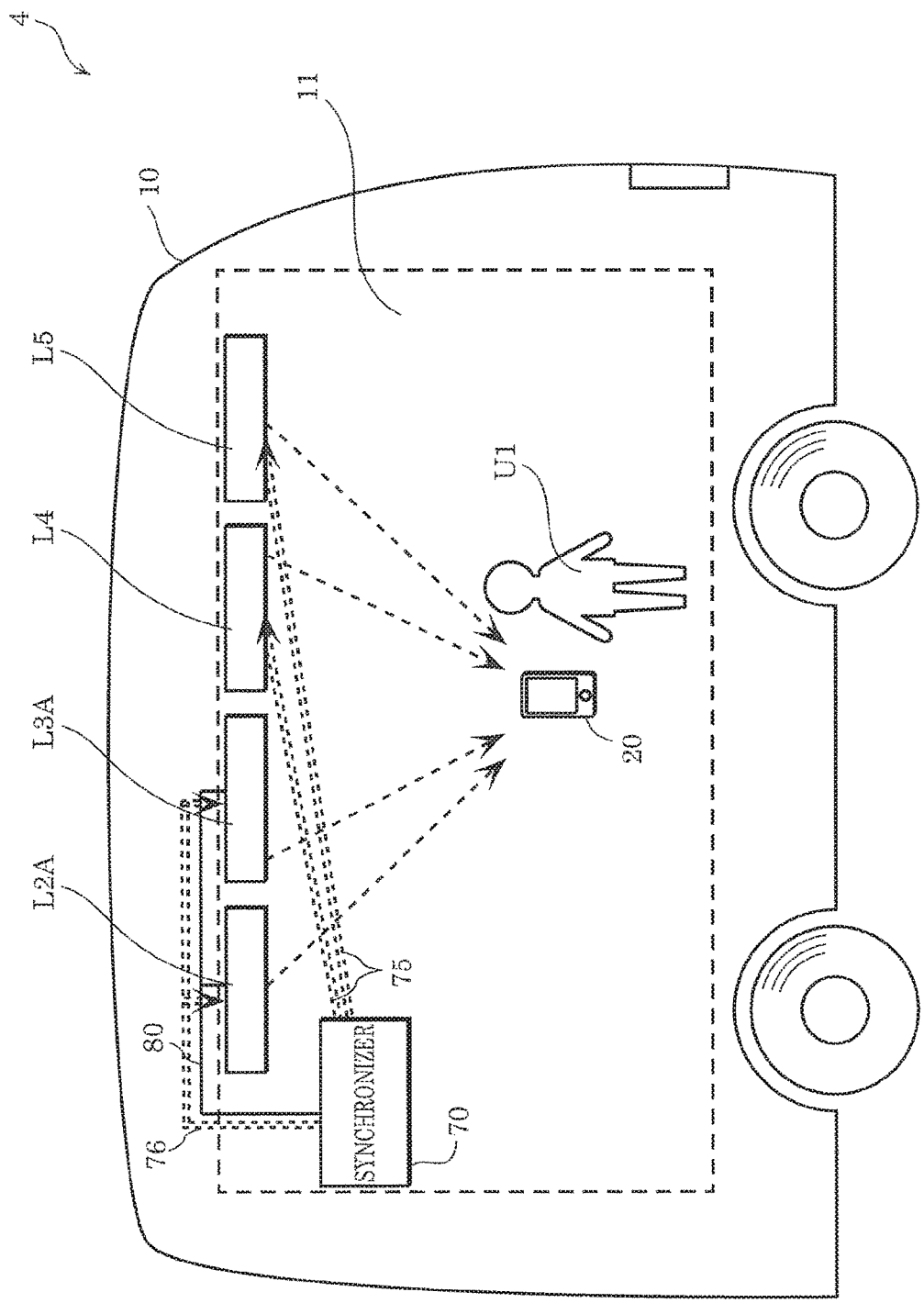
FIG. 28 is a conceptual diagram illustrating an information presenting system according to Variation 1 of Embodiment 3.

FIG. 28 is a conceptual diagram illustrating information presenting system 4 according to this variation.

As illustrated in FIG. 28, information presenting system 4, lighting apparatuses L2A, L3A, L4, and L5 provided in passenger space 11 of bus 10, synchronizer 70, and terminal 20.

Synchronizer 70 is connected to lighting apparatuses L2A and L3A by signal line 80, and transmits, via signal line 80, beacon 76 to each of lighting apparatuses L2A and L3A. Beacon 76 is different from beacon 75 in that beacon 76 is not transmitted by a radio wave, but via signal line 80, yet information included in beacon 76 is the same as the information included in beacon 75. Synchronizer 70 transmits beacon 75 to lighting apparatuses L4 and L5, as with Embodiment 3.

Typically, with regard to beacon 75 transmitted by a radio wave, a portion of or the entire signal may be missing due to a noise of the radio wave, for instance, and thus lighting apparatuses including lighting apparatus L2 may not successfully receive the signal. On the other hand, with regard to beacon 76 transmitted via signal line 80, a portion of or the entire signal is less likely to be missing than beacon 75 which is transmitted by a radio wave. Accordingly, in information presenting system 4, synchronizer 70 allows the lighting apparatuses to more reliably receive beacon 76, by transmitting beacon 76 via signal line 80 instead of a radio wave.

Variation 2 of Embodiment 3

This variation describes a second technique of further reliably synchronizing a plurality of lighting apparatuses, with the information presenting system and the information presenting method according to Embodiment 3. Note that the same numeral may be given to the same element as that of the above embodiments, and a detailed description thereof may be omitted.

Figure 29:
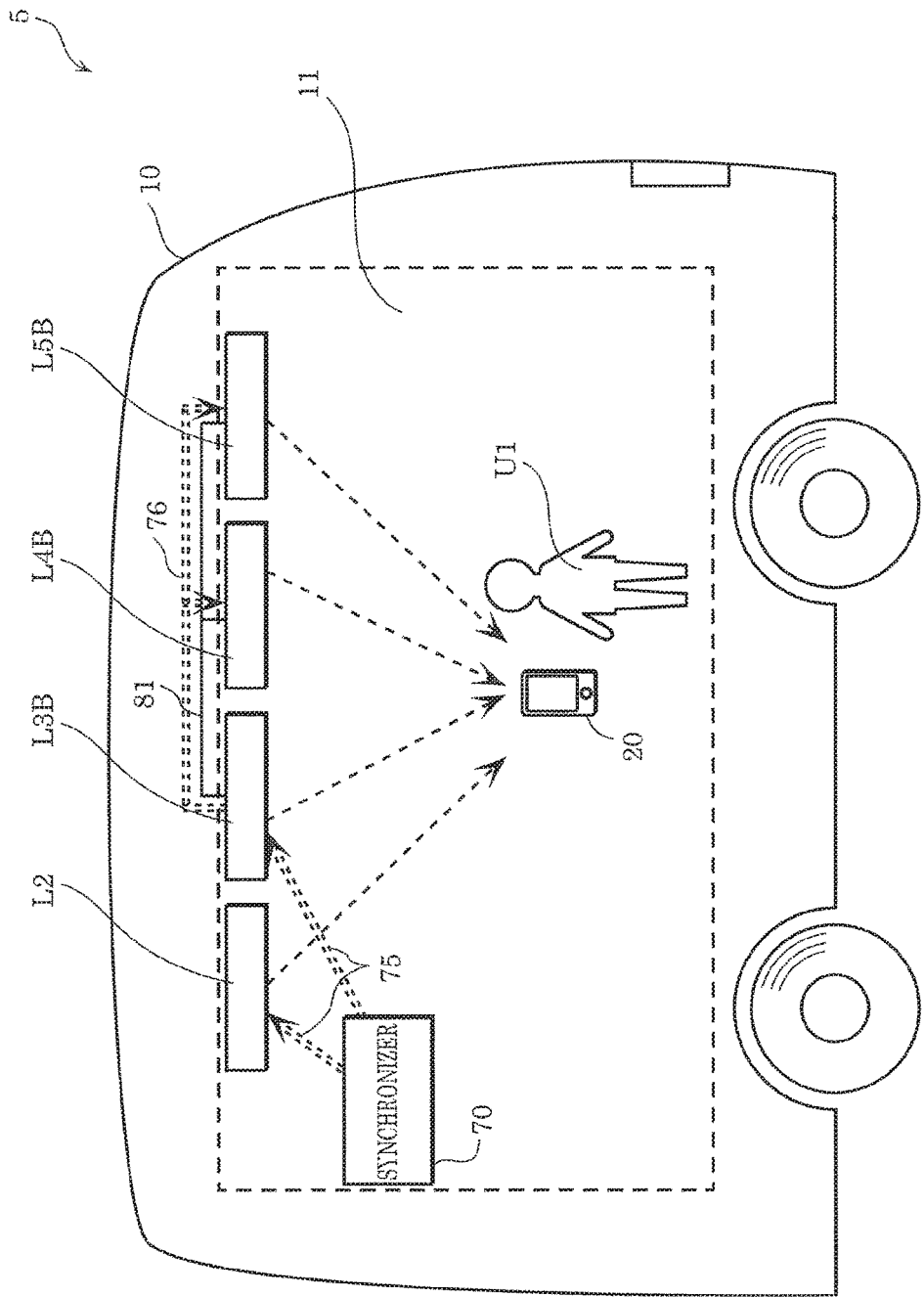
FIG. 29 is a conceptual diagram illustrating an information presenting system according to Variation 2 of Embodiment 3.

FIG. 29 is a conceptual diagram illustrating information presenting system 5 according to this variation.

As illustrated in FIG. 29, information presenting system 5 includes lighting apparatuses L2, L3B, L4B, and L5B provided in passenger space 11 of bus 10, synchronizer 70, and terminal 20.

Synchronizer 70 is the same as synchronizer 70 according to the above embodiments.

Lighting apparatuses L3B, L4B, and L5B are connected by signal line 81 so as to communicate with one another. Lighting apparatus L3B among the lighting apparatuses connected by signal line 81 transmits, to signal line 81, beacon 76 which is beacon 75 received by a radio wave from synchronizer 70. Even if lighting apparatuses L4B and L5B cannot receive beacon 75 by a radio wave from synchronizer 70, lighting apparatuses L4B and L5B achieve similar effects to those of the above embodiments, by receiving beacon 76 via signal line 81.

Accordingly, lighting apparatuses L4B and L5B can receive beacon 76 more reliably in information presenting system 5.

Note that lighting apparatus L3B may transmit, to other lighting apparatuses (lighting apparatuses L4B and L5B) via signal line 81, a signal indicating a value of a current modulated by modulation circuit 105 of lighting apparatus L3B. Modulation circuits 105 of the other lighting apparatuses may modulate a value of a current in phase with the transmitted signal. This achieves a match of the phase of visible light communication signals between the lighting apparatuses connected by signal line 81.

Variation 3 of Embodiment 3

This variation describes an information presenting system and an information presenting method which allow a plurality of lighting apparatuses to appropriately present predetermined information to a terminal. Note that the same numeral may be given to the same element as that of the above embodiments, and a detailed description thereof may be omitted.

Figure 30:
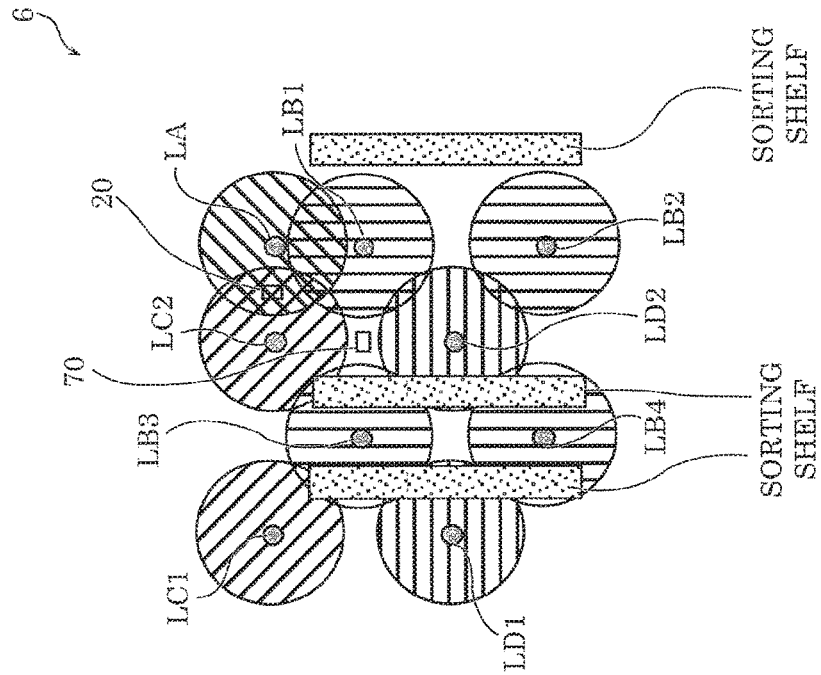
FIG. 30 is a conceptual diagram illustrating an information presenting system according to Variation 3 of Embodiment 3.

FIG. 30 is a conceptual diagram illustrating information presenting system 6 according to this variation. FIG. 30 illustrates an information presenting system which allows a plurality of lighting apparatuses to present predetermined information to terminal 20 in a space of a warehouse or an office, for instance.

As illustrated in FIG. 30, information presenting system 6 includes lighting apparatuses LA, LB1, LB2, LB3, LB4, LC1, LC2, LD1, and LD2, synchronizer 70, and terminal 20. In the space where information presenting system 6 is installed, sorting shelves are disposed, and illumination light may be blocked by the sorting shelves. Lighting apparatus LA and the other lighting apparatuses are disposed so as to emit illumination light over substantially the entire space, taking into consideration a block of the illumination light by the sorting shelves, for instance.

Lighting apparatus LA belongs to group A. Lighting apparatuses LB1, LB2, LB3, and LB4 belong to group B. Lighting apparatuses LC1 and LC2 belong to group C. Lighting apparatuses LD1 and LD2 belong to group D. By receiving beacon 75 from synchronizer 70, each of the lighting apparatuses determines a time slot in which the lighting apparatus is to transmit light which includes a visible light communication signal, and transmits such light which includes the visible light communication signal in the determined time slot. In this manner, terminal 20 can receive a visible light communication signal appropriately from a plurality of lighting apparatuses.

In information presenting system 6 according to this variation, synchronizer 70 may be further connected to lighting apparatus L2 and other lighting apparatuses by signal line 80, and beacon transmitter 711 may transmit, via signal line 80, beacon 76 to lighting apparatus L2 and the other lighting apparatuses connected by signal line 80, as described above.

Accordingly, synchronizer 70 allows lighting apparatus L2 and the other lighting apparatuses to receive beacon 76 more reliably by transmitting beacon 76 via signal line 80.

The lighting apparatuses including lighting apparatus L2 may include a first lighting apparatus and a second lighting apparatus which are connected by signal line 81, and when beacon receiver 133 included in the first lighting apparatus receives beacon 75, the first lighting apparatus may transmit beacon 76 to the second lighting apparatus via signal line 81.

According to this, lighting apparatus L2, for instance, receives beacon 75 from synchronizer 70, and transmits received beacon 75 to another lighting apparatus as beacon 76 via signal line 81. Thus, lighting apparatus L2 and other lighting apparatuses can receive beacon 76 more reliably.

The lighting apparatuses including lighting apparatus L2 may include a first lighting apparatus and a second lighting apparatus which are connected by signal line 81, the first lighting apparatus may transmits a signal indicating the value modulated by modulation circuit 105 to the second lighting apparatus via signal line 81, and modulation circuit 105 included in the second lighting apparatus may modulate the value in phase with the first lighting apparatus, based on the signal received from the first lighting apparatus via signal line 81.

According to this, the phases of visible light communication signals are cause to match between lighting apparatuses connected by signal line 81, and visible light communication signals in phase with one another, which are transmitted by the lighting apparatuses including lighting apparatus L2, can be received by terminal 20.

Others

The above has described the information presenting system and the information presenting method according to the present disclosure based on the embodiments, yet the present disclosure is not limited to the above embodiments.

The scope of the present disclosure may also include embodiments as a result of adding, to the embodiments, various modifications that may be conceived by those skilled in the art, and embodiments obtained by combining elements and functions according to the embodiments in any manner as long as the combination does not depart from the spirit of the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. An information presenting method for presenting information to a passenger on a passenger carrier which stops at predetermined boarding-and-alighting points, the information presenting method comprising:
   (a) emitting, by a lighting apparatus provided in the passenger carrier, light to a passenger space of the passenger carrier, the light including, in form of a visible light communication signal, unique information which is unique to the passenger carrier and specific to a location of the passenger carrier;

(b) receiving in the passenger space, by a terminal carried by the passenger, the light emitted in (a) and obtaining the unique information included in the received light;

(c) obtaining, among the predetermined boarding-and-alighting points, one or more stop points at which the passenger carrier is currently stopped or is to subsequently stop, the one or more boarding-and-alighting points being derived from the obtained unique information;

(d) receiving an alighting point at which the passenger is to alight from the passenger carrier;

(e) determining whether the alighting point is included in the one or more stop points; and (f) presenting, to the passenger via the terminal, alighting information notifying the passenger to alight from the passenger carrier, when the alighting point is determined to be included in the one or more stop points in (e).

2. The information presenting method according to claim 1, wherein
in (c), among the one or more stop points, a next stop point at which the passenger carrier is currently stopped or is to stop next is obtained, and
in (e), whether the next stop point and the alighting point match is determined.

3. The information presenting method according to claim 1, wherein
in (a), the light is emitted only when the passenger carrier is on a route of the passenger carrier at a point other than the predetermined boarding-and-alighting points.

4. The information presenting method according to claim 2, further comprising:
(g) transmitting the unique information obtained in (b) and the alighting point received in (d) to a server storing one or more pieces of predetermined information associated in advance with one or more of the predetermined boarding-and-alighting points; and
(h) receiving, from the server, predetermined information associated with the alighting point transmitted in (g) among the one or more pieces of predetermined information stored in the server, wherein
in (f), the predetermined information received in (h) is presented to the passenger in addition to the alighting information.

5. The information presenting method according to claim 4, further comprising:
(i) determining whether the unique information transmitted in (g) is authentic, wherein
in (h), receiving the predetermined information associated with the alighting point transmitted in (g) among the one or more pieces of predetermined information stored in the server is received from the server, when the unique information is determined to be authentic in (i).

6. The information presenting method according to claim 4, wherein
in (d), alighting points at which passengers including the passenger are to alight from the passenger carrier are received,
in (b), the unique information included in the light emitted in (a) is obtained by each of terminals carried by the passengers, and
in (g), the unique information obtained by each of the terminals in (b) and the alighting points received in (d) are transmitted to the server,
the information presenting method further comprising:
(j) by analyzing the transmitted alighting points, estimating, for each of the predetermined boarding-and-alighting points, an alighting time for a passenger to alight from the passenger carrier and the number of passengers who are to alight from the passenger carrier at the predetermined boarding-and-alighting point; and
(k) outputting the alighting times and the numbers of passengers who are to alight from the passenger carrier estimated in (j).

7. An information presenting system which presents information to a passenger on a passenger carrier which stops at predetermined boarding-and-alighting points, the information presenting system comprising:
a lighting apparatus provided in the passenger carrier; and
a terminal carried by the passenger, wherein
the lighting apparatus includes
a light emitter which emits light to a passenger space of the passenger carrier, the light including, in form of a visible light communication signal, unique information which is unique to the passenger carrier and specific to a location of the passenger carrier, and
the terminal includes:
a receiver which receives, in the passenger space, the light emitted by the light emitter, and obtains the unique information included in the received light;
an obtainer which obtains, among the predetermined boarding-and-alighting points, one or more stop points at which the passenger carrier is currently stopped or is to subsequently stop, the one or more stop points being derived from the obtained unique information;
a user interface which receives input of an alighting point at which the passenger is to alight from the passenger carrier;
a determiner which determines whether the passenger carrier is near the alighting point, by comparing the one or more stop points and the alighting point; and
a presenter which presents, to the passenger, alighting information indicating that the passenger carrier is near the alighting point, when the determiner determines the passenger carrier to be near the alighting point.

8. The information presenting system according to claim 7, further comprising
a beacon transmitter which transmits, to the lighting apparatus, a beacon for determining a timing at which the lighting apparatus is to emit the light which includes the unique information, wherein
the lighting apparatus includes:
a light source;
a power supply which supplies a current for causing the light source to emit light;
a beacon receiver which receives the beacon from the beacon transmitter; and
a modulation circuit which causes the light source to emit light which includes a visible light communication signal, by modulating a value of the current to be supplied to the light source, based on a time when the beacon receiver receives the beacon.

9. The information presenting system according to claim 8, wherein
lighting apparatuses which are divided into groups are provided, each of the lighting apparatuses being the lighting apparatus, and
the beacon transmitter transmits the beacon to the lighting apparatuses belonging to the groups.

10. The information presenting system according to claim 9, wherein
the lighting apparatus further includes
a radio beacon transmitter which transmits, by a radio wave, a terminal beacon to be received by the terminal, based on the time when the beacon receiver receives the beacon.

11. The information presenting system according to claim 9, wherein
at least one of the lighting apparatuses includes:
the beacon transmitter; and
a transmission controller which causes the beacon transmitter to start transmitting the beacon when a predetermined period has elapsed without the beacon receiver receiving the beacon from outside the lighting apparatus.

12. The information presenting system according to claim 9, further comprising
a synchronizer which is a separate device from the lighting apparatuses, and includes the beacon transmitter.

13. The information presenting system according to claim 9, wherein
the lighting apparatuses include a first lighting apparatus and a second lighting apparatus which are connected by a signal line, and
when the beacon receiver included in the first lighting apparatus receives the beacon, the first lighting apparatus transmits the beacon to the second lighting apparatus via the signal line.

14. The information presenting system according to claim 9, wherein
the lighting apparatuses include a first lighting apparatus and a second lighting apparatus which are connected by a signal line,
the first lighting apparatus transmits a signal indicating the value modulated by the modulation circuit to the second lighting apparatus via the signal line, and
the modulation circuit included in the second lighting apparatus modulates the value in phase with the first lighting apparatus, based on the signal received from the first lighting apparatus via the signal line.

15. The information presenting system according to claim 12, wherein
the synchronizer is connected to the lighting apparatuses by a signal line, and
the beacon transmitter included in the synchronizer transmits, via the signal line, the beacon to the lighting apparatuses connected by the signal line.

* * * * *